United States Patent
Lee et al.

(10) Patent No.: US 10,083,468 B2
(45) Date of Patent: *Sep. 25, 2018

(54) EXPERIENCE SHARING FOR A REGISTRY EVENT

(71) Applicant: Google LLC, Mountain View, CA (US)

(72) Inventors: Steven John Lee, San Francisco, CA (US); Bradley James Rhodes, Mountain View, CA (US); Indika Charles Mendis, Mountain View, CA (US); Max Benjamin Braun, San Francisco, CA (US)

(73) Assignee: Google LLC, Mountain View, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/976,466

(22) Filed: Dec. 21, 2015

(65) Prior Publication Data

US 2016/0110783 A1    Apr. 21, 2016

Related U.S. Application Data

(63) Continuation of application No. 13/553,568, filed on Jul. 19, 2012, now Pat. No. 9,245,288.

(60) Provisional application No. 61/510,020, filed on Jul. 20, 2011.

(51) Int. Cl.
| | |
|---|---|
| G06Q 30/06 | (2012.01) |
| H04L 29/06 | (2006.01) |
| H04L 12/18 | (2006.01) |
| H04L 12/58 | (2006.01) |
| G06F 3/16 | (2006.01) |
| G06F 17/30 | (2006.01) |
| G06Q 30/04 | (2012.01) |
| G06T 19/00 | (2011.01) |
| G09G 5/00 | (2006.01) |

(52) U.S. Cl.
CPC ............ *G06Q 30/06* (2013.01); *G06F 3/167* (2013.01); *G06F 17/30345* (2013.01); *G06F 17/30876* (2013.01); *G06Q 30/04* (2013.01); *G06Q 30/0605* (2013.01); *G06Q 30/0625* (2013.01); *G06Q 30/0635* (2013.01); *G06Q 30/0641* (2013.01); *G06Q 30/0643* (2013.01); *G06T 19/006* (2013.01); *G09G 5/006* (2013.01); *H04L 12/1822* (2013.01); *H04L 29/06476* (2013.01); *H04L 51/046* (2013.01); *H04L 65/1069* (2013.01); *H04L 65/4076* (2013.01); *H04L 51/12* (2013.01); *H04L 51/14* (2013.01)

(58) Field of Classification Search
CPC .......................................... G06Q 30/06–30/08
USPC ................................................. 705/26.1–27.2
See application file for complete search history.

(56) References Cited

U.S. PATENT DOCUMENTS

| | | |
|---|---|---|
| 6,611,242 B1 | 8/2003 | Hongo |
| 6,711,414 B1 | 3/2004 | Lightman |
| 7,255,437 B2 | 8/2007 | Howell et al. |
| 7,401,918 B2 | 7/2008 | Howell et al. |

(Continued)

*Primary Examiner* — Ethan D Civan
*Assistant Examiner* — Ming Shui
(74) *Attorney, Agent, or Firm* — McDonnell Boehnen Hulbert & Berghoff LLP; Michael D. Clifford

(57) ABSTRACT

Disclosed herein are methods and corresponding systems for facilitating a live registry event between a shopper and one or more remote viewers. In the live registry event, the shopper, registers for gifts that they would like to receive while sharing their registering experience with the viewers in real-time. When the user registers for an item, a server system allows the viewers to purchase the gift for the shopper.

19 Claims, 11 Drawing Sheets

(56) References Cited

U.S. PATENT DOCUMENTS

| | | |
|---|---|---|
| 7,481,531 B2 | 1/2009 | Howell et al. |
| 7,526,440 B2 | 4/2009 | Walker et al. |
| 7,543,934 B2 | 6/2009 | Howell et al. |
| 7,546,352 B1 | 6/2009 | Bhattiproplu et al. |
| 7,683,937 B1 | 3/2010 | Blumenfeld |
| 7,771,046 B2 | 8/2010 | Howell et al. |
| 7,780,450 B2 | 8/2010 | Tarry |
| 7,792,552 B2 | 9/2010 | Thomas et al. |
| 7,806,525 B2 | 10/2010 | Howell et al. |
| 8,094,090 B2 | 1/2012 | Fisher |
| 8,612,312 B1 | 12/2013 | Edwards et al. |
| 8,836,771 B2 | 9/2014 | Strong |
| 2002/0030637 A1 | 3/2002 | Mann |
| 2005/0138560 A1 | 6/2005 | Lee et al. |
| 2008/0086386 A1 | 4/2008 | Bell |
| 2008/0103877 A1 | 5/2008 | Gerken |
| 2008/0270541 A1 | 10/2008 | Keener et al. |
| 2009/0013263 A1 | 1/2009 | Fortnow et al. |
| 2009/0157816 A1 | 6/2009 | Pattan |
| 2009/0215477 A1 | 8/2009 | Lee et al. |
| 2009/0219166 A1 | 9/2009 | MacFarlane et al. |
| 2010/0082759 A1 | 4/2010 | Nalliah et al. |
| 2010/0125531 A1 | 5/2010 | Wong |
| 2011/0035453 A1 | 2/2011 | Koul et al. |
| 2011/0055046 A1 | 3/2011 | Bowen et al. |
| 2011/0096168 A1 | 4/2011 | Siann et al. |
| 2011/0221657 A1 | 9/2011 | Haddick et al. |
| 2011/0246421 A1 | 10/2011 | Takahashi |
| 2012/0056972 A1 | 3/2012 | Benedeki et al. |
| 2012/0069131 A1 | 3/2012 | Abelow |
| 2012/0166453 A1 | 6/2012 | Broder |
| 2012/0182384 A1 | 7/2012 | Anderson et al. |
| 2012/0320013 A1 | 12/2012 | Perez et al. |

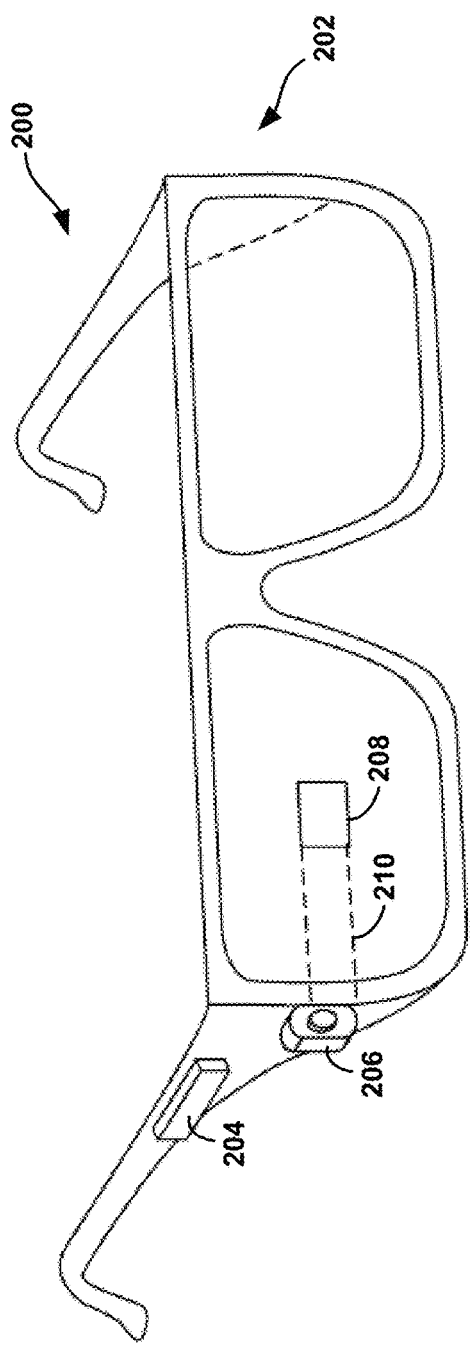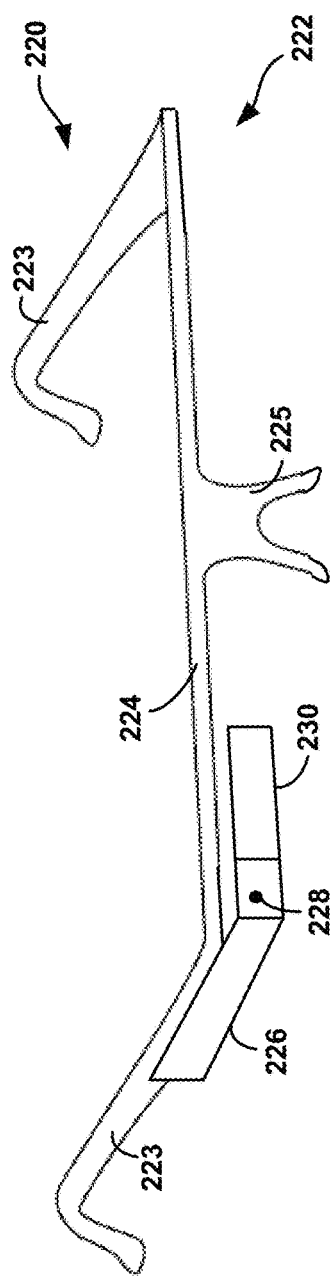
FIG. 3A
FIG. 3B

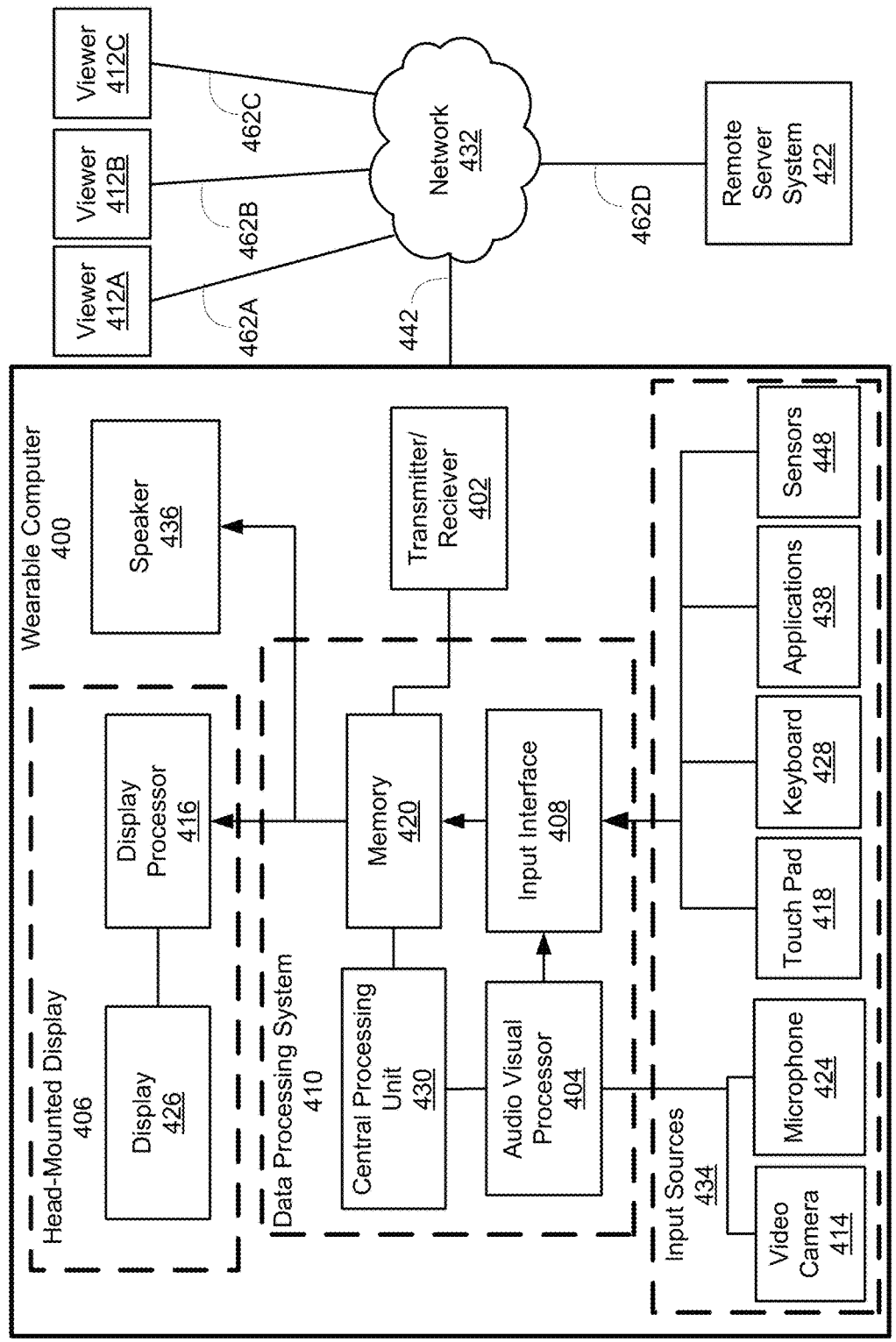

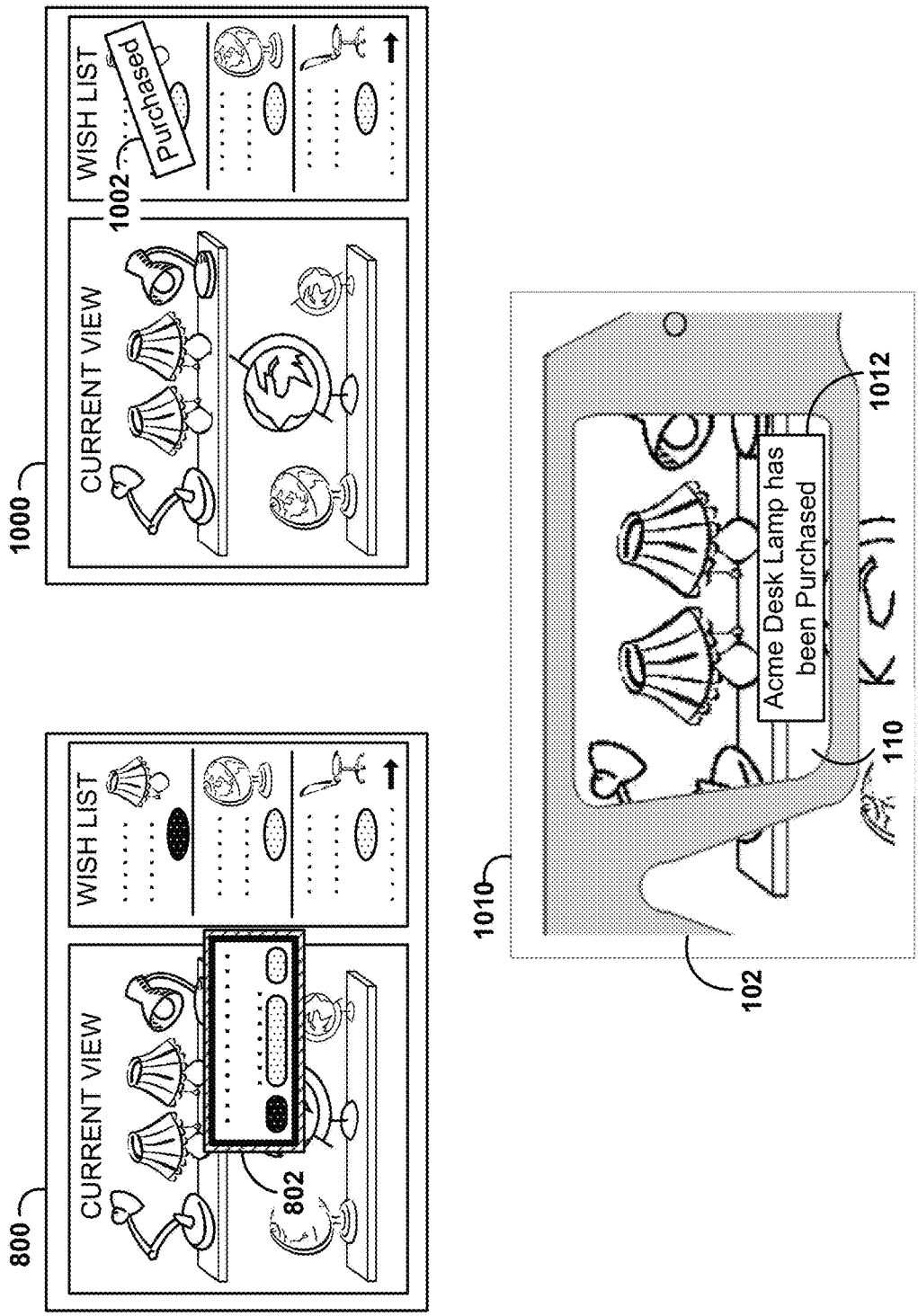

EXPERIENCE SHARING FOR A REGISTRY EVENT

CROSS REFERENCE TO RELATED APPLICATIONS

This application is a continuation of U.S. patent application Ser. No. 13/553,568, filed Jul. 19, 2012, which claims priority to U.S. Patent Application No. 61/510,020, filed Jul. 20, 2011, the contents of both of which are incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays". A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary method involves a server system facilitating a registry event that includes an experience-sharing session (ESS) between a sharing device and one or more viewing devices. Additionally, the exemplary method involves receiving indications, from the sharing device, of items of interest and responsively adding the items of interest to a registry list. Further, the method involves providing real-time updates of the registry list to the viewing devices as the items of interest are added to the registry list. The method also involves receiving a purchase request from at least one viewing device for a selected item of interest on the registry list. The method further involves, in response to receiving the purchase request, initiating a purchase transaction to bill an account or accounts associated with the at least one viewing device that requested the purchase and to provide the selected item of interest to the user of the sharing device.

In another aspect, an exemplary server system may include a non-transitory computer-readable medium in which program instructions are stored. These instructions are executable by a processor to facilitate a registry event that includes an ESS between a sharing device and one or more viewing devices. The instructions are further executable by the processor to receive indications, from the sharing device, of items of interest, responsively add the items of interest to a registry list, and provide real-time updates of the registry list to the viewing devices as the items of interest are added to the registry list. Further, instructions are executable by the processor to receive a purchase request from at least one viewing device for a selected item of interest on the registry list and, in response, to initiate a purchase transaction to bill at least one account associated with the viewing device, or devices, that requested the purchase and to provide the selected item of interest to a user of the sharing device.

In another aspect, an exemplary non-transitory computer-readable medium may have instructions stored on it that are executable by a processor to cause a server system to facilitate a registry event that includes an ESS between a sharing device and one or more viewing devices. Further, the instructions are executable to cause the server system to receive indications, from the sharing device, of items of interest, responsively add the items of interest to a registry list, and provide real-time updates of the registry list to the viewing devices as the items of interest are added to the registry list. Additionally, the instructions are executable to cause the server system to receive a purchase request from at least one viewing device for a selected item of interest on the registry list and, in response, to initiate a purchase transaction to bill at least one account associated with the viewing device, or devices, that requested the purchase and to provide the selected item of interest to a user of the sharing device.

BRIEF DESCRIPTION OF THE DRAWINGS

FIG. 3A illustrates an example sharing device.

FIG. 3B illustrates an example sharing device.

FIG. 4 shows a simplified block diagram of an example experience sharing system architecture.

FIG. 10 shows example user-interfaces for a sharing device and two viewing devices.

DETAILED DESCRIPTION

Figure 1:
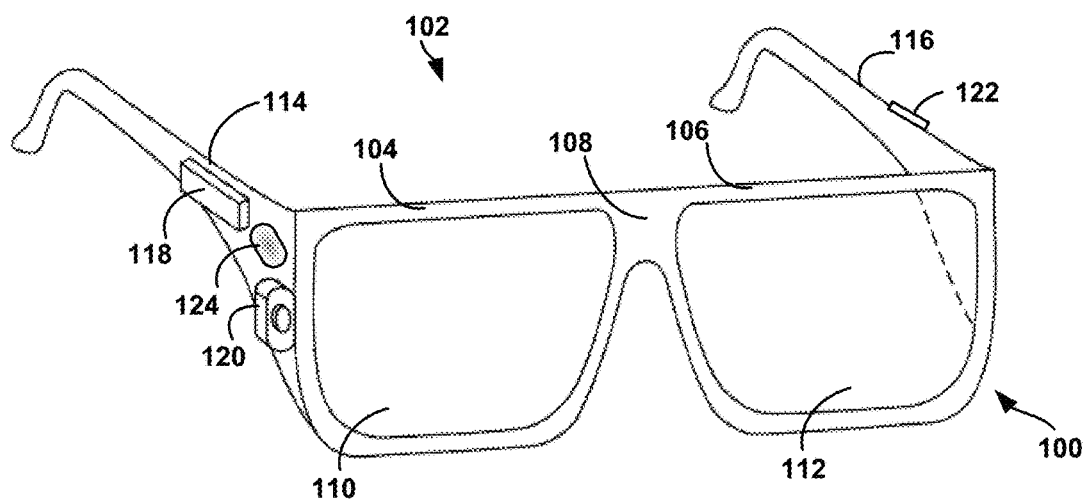
FIG. 1 illustrates an example sharing device.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

Disclosed herein are methods and systems that may help to facilitate a live registry event between a shopper and one or more remote viewers. In the live registry event, the shopper registers for gifts that they would like to receive while sharing their registering experience with the viewers. When the user registers for an item, a server system allows the viewers to purchase the gift for the user of the sharing device. In particular, the server system may provide a registry list to the viewers and the viewers may select items for purchase from this list. In response to receiving a purchase request from a viewer, the server may bill the viewer for the selected item and send the item to the shopper.

To share their shopping experience with the viewers, the shopper may use a portable computing device to capture and share media that conveys the world as the shopper is experiencing it. An experience-sharing session (ESS) may, for instance include a user sharing a point-of-view video feed captured using a video camera on their head-mountable device, along with a real-time audio feed captured using a microphone on their device. Users of the remote viewing devices may view the captured media along with the updated registry list.

As a specific example situation, the shopper may be registering for wedding gifts. The shopper may browse through a store looking for potential gifts while capturing video and audio from their experience. Friends of the shopper may join the live registry event as viewers and play the captured video and audio to view the experience of the shopper. As the shopper adds items to their registry list, the friends may therefore observe the shopper's reaction to the indicated item, so that they can better select a gift or gifts that they wish to give to the shopper. Further, the friends may discuss the desired items with one another to help in selecting gifts or to enable cost-sharing between multiple viewers.

In this way, a friend, or a group of friends, may find an item that they would like to give to the shopper. Then, they may purchase the item and either have the gift sent to the shopper or deliver it themselves. As items are added to the registry and purchased from the registry, a registry server may notify the viewers of changes to the registry. In this way, the server may provide viewers with a current list of potential gifts and help the viewers to avoid purchasing duplicate gifts.

In an ESS, the computing device that is sharing the shopper's experience may be referred to as a "sharing device" or a "sharer," while the computing device or devices that are receiving media from the sharer may each be referred to as a "viewing device" or a "viewer." Additionally, the content that is shared by the sharing device during an ESS may be referred to as a "share." Further, a computing system that supports an ESS between a sharer and one or more viewers may be referred to as a "server", an "ES server," "server system," or "supporting server system."

A share may include a single type of media content (i.e., a single modality of media), or may include multiple types of media content (i.e., multiple modalities of media). In either case, a share may include a video feed, a three-dimensional (3D) video feed (e.g., video created by two cameras that is combined to create 3D video), an audio feed, a text-based feed, an application-generated feed, and/or other types of media content. Some or all of the media content may be transmitted in real-time, so that the shared experience is sufficiently recent to depict a user's current status. In this case, "real-time" refers to the fact that the shared media is transmitted as it is being captured. However, it should be understood that there may be some delay time between capture and receptions of a share due to the systems, techniques, and user-preferences used in capturing, processing, transmitting, and receiving the share.

Further, in some embodiments a share may include multiple feeds of the same type of media content. For example, in some embodiments, a share may include two or more video feeds. For instance, a share could include a first video feed from a forward-facing camera on a head-mountable display (HMD), and a second video feed from a camera on the HMD that is facing inward towards the wearer's face. As another example, a share could include multiple audio feeds for stereo audio or spatially-localized audio providing surround sound.

2. Exemplary Device Architecture

FIG. 1 illustrates an example system 100 for receiving, transmitting, and displaying data. The system 100 is shown in the form of a wearable computing device. While FIG. 1 illustrates a head-mountable device 102 as an example of a wearable computing device, other types of wearable computing devices could additionally or alternatively be used. As illustrated in FIG. 1, the head-mountable device 102 comprises frame elements including lens-frames 104, 106 and a center frame support 108, lens elements 110, 112, and extending side-arms 114, 116. The center frame support 108 and the extending side-arms 114, 116 are configured to secure the head-mountable device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mountable device 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the head-mountable device 102 to the user. The extending side-arms 114, 116 may further secure the head-mountable device 102 to the user by extending around a rear portion of the user's head. Additionally or alternatively, for example, the system 100 may connect to or be affixed within a head-mountable helmet structure. Other possibilities exist as well.

The system 100 may also include an on-board computing system 118, a video camera 120, a sensor 122, and a finger-operable touch pad 124. The on-board computing system 118 is shown to be positioned on the extending side-arm 114 of the head-mountable device 102; however, the on-board computing system 118 may be provided on other parts of the head-mountable device 102 or may be positioned remote from the head-mountable device 102 (e.g., the on-board computing system 118 could be wire- or wirelessly-connected to the head-mountable device 102). The on-board computing system 118 may include a processor and memory, for example. The on-board computing system 118 may be configured to receive and analyze data from the video camera 120 and the finger-operable touch pad 124 (and possibly from other sensory devices, user interfaces, or both) and generate images for output by the lens elements 110 and 112.

The video camera 120 is shown positioned on the extending side-arm 114 of the head-mountable device 102; however, the video camera 120 may be provided on other parts of the head-mountable device 102. The video camera 120 may be configured to capture images at various resolutions or at different frame rates. Many video cameras with a small form-factor, such as those used in cell phones or webcams, for example, may be incorporated into an example of the system 100.

Further, although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the head-mountable device 102; however, the sensor 122 may be positioned on other parts of the head-mountable device 102. The sensor 122 may include one or more of a gyroscope or an accelerometer, for example. Other sensing devices may be included within, or in addition to, the sensor 122 or other sensing functions may be performed by the sensor 122.

The finger-operable touch pad 124 is shown on the extending side-arm 114 of the head-mountable device 102. However, the finger-operable touch pad 124 may be positioned on other parts of the head-mountable device 102. Also, more than one finger-operable touch pad may be present on the head-mountable device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 2:
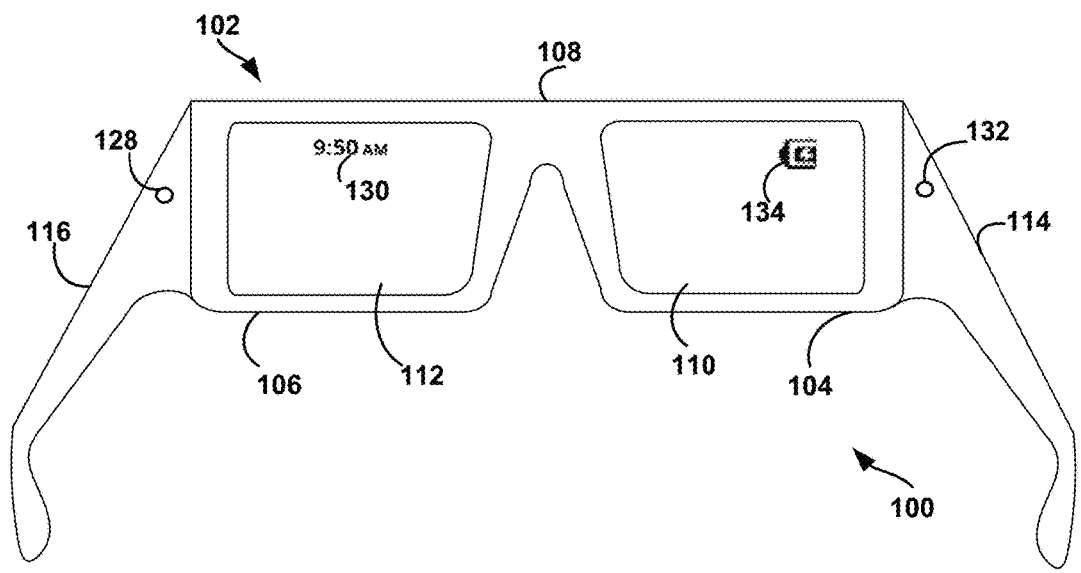
FIG. 2 illustrates an alternate view of the system illustrated in FIG. 1A.

FIG. 2 illustrates an alternate view of the system 100 illustrated in FIG. 1. As shown in FIG. 2, the lens elements 110, 112 may act as display elements. The head-mountable device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

FIG. 3A illustrates an example system 200 for receiving, transmitting, and displaying data. The system 200 is shown in the form of a wearable computing device 202. The wearable computing device 202 may include frame elements and side-arms such as those described with respect to FIGS. 1 and 2. The wearable computing device 202 may additionally include an on-board computing system 204 and a video camera 206, such as those described with respect to FIGS. 1 and 2. The video camera 206 is shown mounted on a frame of the wearable computing device 202; however, the video camera 206 may be mounted at other positions as well.

As shown in FIG. 3A, the wearable computing device 202 may include a single display 208 which may be coupled to the device. The display 208 may be formed on one of the lens elements of the wearable computing device 202, such as a lens element described with respect to FIGS. 1 and 2, and may be configured to overlay computer-generated graphics in the user's view of the physical world. The display 208 is shown to be provided in a center of a lens of the wearable computing device 202; however, the display 208 may be provided in other positions. The display 208 is controllable via the computing system 204 that is coupled to the display 208 via an optical waveguide 210.

FIG. 3B illustrates an example system 220 for receiving, transmitting, and displaying data. The system 220 is shown in the form of a wearable computing device 222. The wearable computing device 222 may include side-arms 223, a center frame support 224, and a bridge portion with nosepiece 225. In the example shown in FIG. 3B, the center frame support 224 connects the side-arms 223. The wearable computing device 222 does not include lens-frames containing lens elements. The wearable computing device 222 may additionally include an on-board computing system 226 and a video camera 228, such as those described with respect to FIGS. 1 and 2.

The wearable computing device 222 may include a single lens element 230 that may be coupled to one of the side-arms 223 or the center frame support 224. The lens element 230 may include a display such as the display described with reference to FIGS. 1 and 2, and may be configured to overlay computer-generated graphics upon the user's view of the physical world. In one example, the single lens element 230 may be coupled to the inner side (i.e., the side exposed to a portion of a user's head when worn by the user) of the extending side-arm 223. The single lens element 230 may be positioned in front of or proximate to a user's eye when the wearable computing device 222 is worn by a user. For example, the single lens element 230 may be positioned below the center frame support 224, as shown in FIG. 3B.

Any of the above-described exemplary embodiments may additionally include audio devices, including one or more speakers and/or one or more microphones. Audio devices may be integral to the wearable computer or externally connected through a physical wired connection or a wireless radio connection.

3. Exemplary Server Architecture

FIG. 4 is a simplified diagram of an example sharing device. In particular, FIG. 4 shows a wearable computer 400, configured to serve as the sharer in an ESS. It should be understood, however, that other types of computing devices may be configured to provide similar sharing-device functions and/or may include similar components as those described in reference to wearable computer 400, without departing from the scope of the invention.

As shown, wearable computer 400 includes a head-mountable display (HMD) 406, several input sources 434, a data processing system 410, and a transmitter/receiver 402. FIG. 4 also indicates that a communicative link 442 may be established between the wearable computer 400 and a network. Further, the network may connect to a server 422 and one or more viewers 412A, 412B, and 412C through additional connections 462D, 462A, 462B, and 462C.

An exemplary set of input sources 434 are shown in FIG. 4 as features of the wearable computer including a video camera 414, a microphone 424, a touch pad 418, a keyboard 428, one or more applications 438, and other general sensors 448 (e.g. biometric sensors, atmospheric sensors). The input sources 434 may be internal, as shown in FIG. 4, or the input sources 434 may be in part or entirely external. Additionally, the input sources 434 shown in FIG. 4 should not be considered exhaustive, necessary, or inseparable. Exemplary embodiments may exclude any of the exemplary set of input devices 434 and/or include one or more additional input devices that may add to an ESS.

The exemplary data processing system 410 may include a memory system 420, a central processing unit (CPU) 430, an input interface 408, and an audio visual (A/V) processor 404. The memory system 420 may be configured to receive data from the input sources 434 and/or the transmitter/receiver 402. The memory system 420 may also be configured to store received data and then distribute the received data to the CPU 430, the HMD 406, a set of one or more speakers 436, or to a remote device through the transmitter/receiver 402.

The CPU 430 may be configured to detect a stream of data in the memory system 420 and control how the memory system distributes the stream of data. The input interface 408 may be configured to process a stream of data from the input sources 434 and then transmit the processed stream of data into the memory system 420. This processing of the stream of data converts a raw signal, coming directly from the input sources 434 or A/V processor 404, into a stream of data that other elements in the wearable computer 400, the viewers 412, and the server 422 can use. The A/V processor 404 may be configured perform audio and visual processing on one or more audio feeds from one or more microphones 424 and on one or more video feeds from one or more video cameras 414. The CPU 430 may be configured to control the audio and visual processing performed on the one or more audio feeds and the one or more video feeds. Examples of audio and video processing techniques, which may be performed by the A/V processor 404, will be given later.

The transmitter/receiver 402 may be configured to communicate with one or more remote devices through the communication network 432. Each connection made to the network (442, 462A, 462B, 462C, and 462D) may be configured to support two-way communication and may be wired or wireless.

The HMD 406 may be configured to display visual objects derived from many types of visual multimedia, including video, text, graphics, pictures, application interfaces, and animations. In some embodiments, one or more speakers 436 may also present audio objects. Some embodiments of an HMD 406 may include a visual processor 416 to store and transmit a visual object to a physical display 426, which actually presents the visual object. The visual processor 416 may also edit the visual object for a variety of purposes. One purpose for editing a visual object may be to synchronize displaying of the visual object with presentation of an audio object to the one or more speakers 436. Another purpose for editing a visual object may be to compress the visual object to reduce load on the display. Still another purpose for editing a visual object may be to correlate displaying of the visual object with other visual objects currently displayed by the HMD 406.

While FIG. 4 illustrates a wearable computer configured to act as sharing device, it should be understood that a sharing device may take other forms. For example, a sharing device may be a mobile phone, a tablet computer, a personal computer, or any other computing device configured to provide the sharing device functionality described herein.

In general, it should be understood that any computing system or device described herein may include or have access to memory or data storage, which may take include a non-transitory computer-readable medium having program instructions stored thereon. Additionally, any computing system or device described herein may include or have access to one or more processors. As such, the program instructions stored on such a non-transitory computer-readable medium may be executable by at least one processor to carry out the functionality described herein. Further, while not discussed in detail, it should be understood that the components of a computing device that serves as a viewing device in an ESS may be similar to those of a computing device that serves as a sharing device in an ESS. Further, a viewing device may take the form of any type of networked device capable of providing a media experience (e.g., audio and/or video), such as television, a game console, and/or a home theater system, among others.

In some exemplary embodiments a remote server may help reduce the sharer's processing load. In such embodiments, the sharing device may send the share to a remote, cloud-based serving system, which may function to distribute the share to the appropriate viewing devices. As part of a cloud-based implementation, the sharer may communicate with the server through a wireless connection, through a wired connection, or through a network of wireless and/or wired connections. The server may likewise communicate with the one or more viewers through wireless and/or wired connections. The server may then receive, process, store, and/or transmit both the share from the sharer and comments from the viewers.

4. Experience-Sharing Sessions for Registry Events

Figure 5:
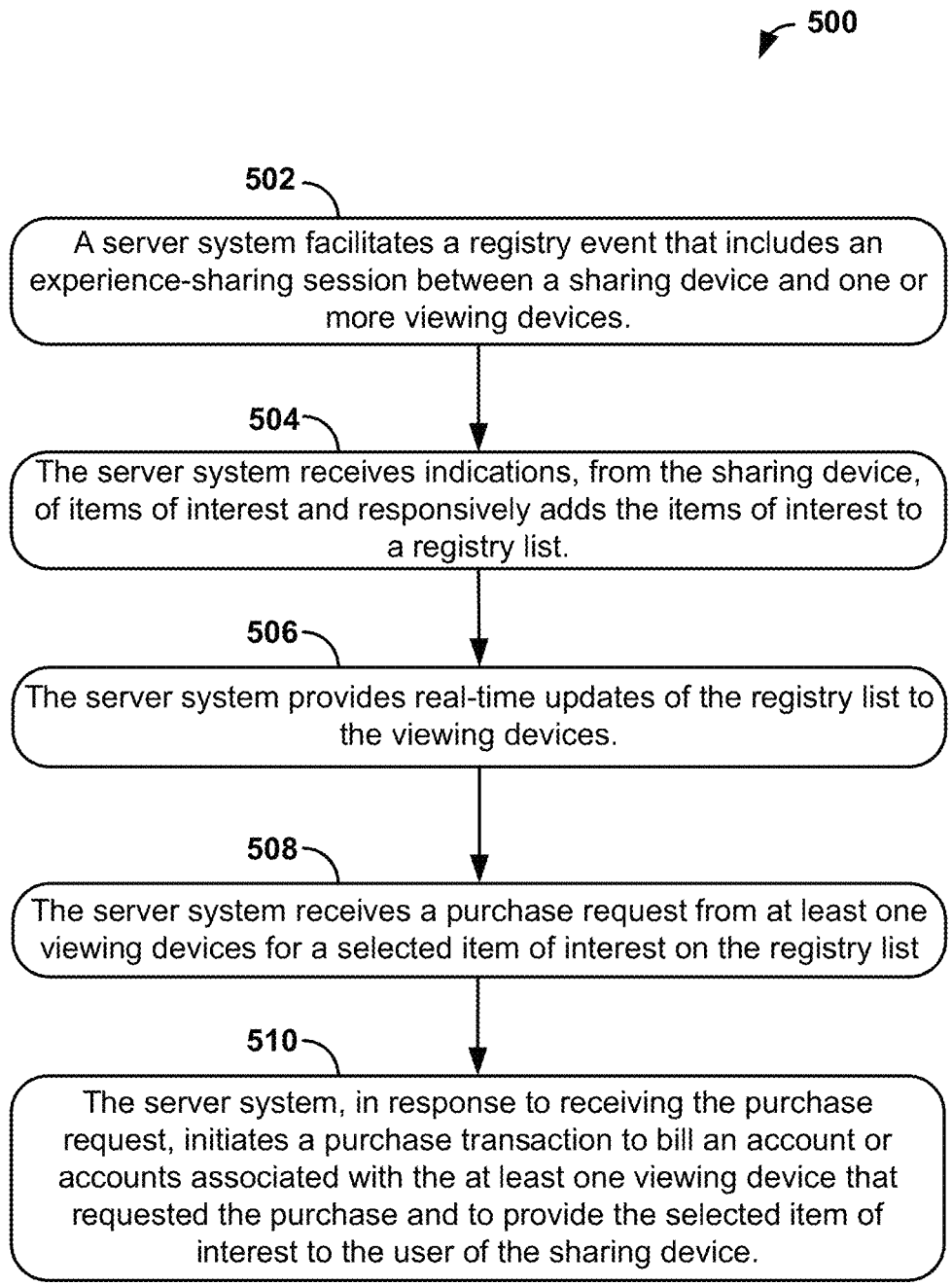
FIG. 5 is a flow chart illustrating a method, according to an exemplary embodiment.

As noted above, FIG. 5 is a flow chart illustrating a method 500, according to an exemplary embodiment. The method 500 involves, facilitating, at a server system, a registry event that includes an ESS between a sharing device and one or more viewing devices, as shown by block 502. At block 504, method 500 involves receiving indications, from the sharing device, of items of interest and responsively adding the items of interest to a registry list. Method 500 further involves providing real-time updates of the registry list to the viewing devices, at block 506. Additionally, method 500 involves, at block 508, receiving a purchase request from at least one viewing device for a selected item of interest on the registry list. And at block 510, the method involves, in response to receiving the purchase request, initiating a purchase transaction to bill at least one account associated with the viewing device(s) that requested the purchase and to provide the selected item of interest to the user of the sharing device.

a. Example ESS

Figure 6:
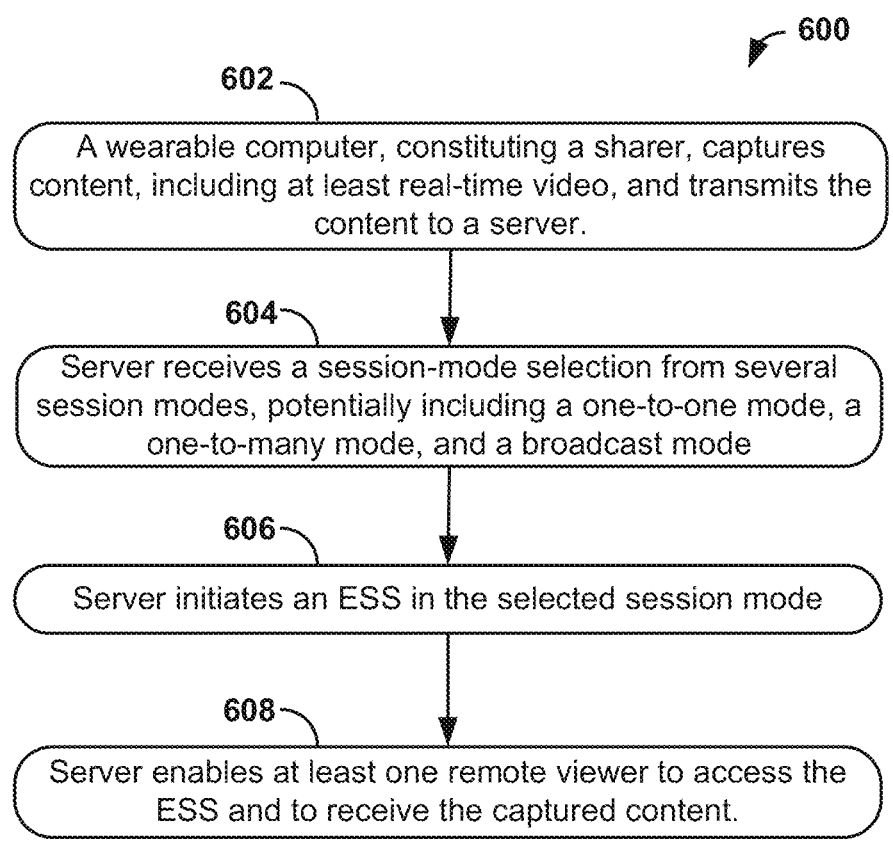
FIG. 6 is a flow chart illustrating an example initiation method for an experience-sharing session.

As indicated by block 502, an exemplary method 500 may involve a server system facilitating a registry event that includes an ESS between a sharing device and one or more viewing devices. An exemplary ESS between a sharing device and one or more viewing devices may be initiated in various ways. FIG. 6 is a flow chart illustrating one particular initiation method for an ESS, according to an exemplary embodiment. Other initiation methods may also be used.

The initiation method 600 may involve a sharer, such as a wearable computer, capturing content that includes at least real-time video and transmitting the content to a server, as shown by block 602. Further, the server may receive a selection of a session mode from several session modes including, for instance, a one-to-one mode, a one-to-many mode, and a broadcast mode, as shown by block 604. For example, the sharer may select a session mode of one-to-many for a registry event, where the sharer indicates a specific group of viewers (e.g., guests invited to the wedding reception, friends who have accepted invitations to a baby shower, etc.) who may join the ESS. As another example, the server may request a list of viewers, and/or receive the list, from a separate server system, network, service, website, or application. For instance, an online social networking service may provide the list of viewers from accounts associated with the shopper. In such a case, the separate system or website may facilitate the ESS by providing a viewer interface and viewer/shopper information. If the sharer indicates a list of specific viewers who may join the ESS, then the server may store the list of specific viewers and, when a prospective viewer attempts to join the ESS, the server may allow them to join if they are on the list. In some cases, the server may send invitations to the specific viewers inviting them to join the registry event when it begins. The sharer may then initiate an ESS in the selected session mode, as shown by block 606, and transmit the captured video to the viewer(s), as shown by block 608.

In a further aspect, when an ESS is initiated, a sharer may place restrictions on which viewers can join and/or participate in the ESS. For example, a sharer may enforce copyright restrictions on the content in the share. In this case, viewers must conform to distribution restrictions pertaining to the copyrighted material when accessing the share. As a further example, a sharer may only share a particular experience with geographically-nearby viewers. Another sharer may only invite viewers associated with users in a corresponding social network. Other types of restrictions are also possible. Further, such restrictions may be placed on an ESS in scenarios other than during initiation of the ESS.

In another aspect, the manner in which an ESS is initiated, and/or what device(s) and/or system(s) are involved in the initiation of an ESS, may depend on the desired type of ESS, and possibly other factors as well.

Exemplary initiation procedures will now be described in reference to various session modes, and in particular, to a one-to-one session mode, to a one-to-many session mode, and to a broadcast session mode.

In the following examples, it should be understood that the server or a viewer may perform any of the functions described as being performed by a sharing or viewing device. For instance, a sharer may initiate an ESS with a particular set of viewing devices by sending a share to a server along with an indication of the intended viewers. Then, the server may perform the actual initiation process and enable the intended viewers to participate in the ESS.

Additionally, a viewing device may act as an administrator of the ESS and perform the functions described below as performed by the sharer. For example, the administrator may initiate the ESS, provide event specific information, and manage the viewers that are invited and/or allowed to participate in the ESS. Further, the administrator may specify their own address as the delivery location for the gifts to facilitate a gift-giving event (e.g., a party, reception, or shower).

i. Receiving Content the Captures the Experience of the Shopper

Shared content (which may be referred to as a "share") that is received as part of the ESS may include various media-types and formats. As discussed earlier, a share may include a single type of media content (i.e., a single modality of media), multiple types of media content (i.e., multiple modalities of media), or multiple feeds from the same type of media.

Further, a sharing device may share any type of media content that captures the shopping experience at the sharer. For example, shared content may include, but is not limited to, video, 3D video, audio, text, still pictures, images, gaze tracking information, body position information, and/or interpreted sensory data (representations of smell, touch, or taste experiences). This content may be captured by sensors integrally connected or otherwise in communication with the sharing device, such as input sources 434 and/or other sensors that are externally connected to the sharing device (not shown).

Additionally, a server system may process a share in various ways before sending the share to a given viewer. For example, the server may format media components of a share to help adjust for a particular viewer's needs or preferences. For instance, consider a viewer that is participating in an ESS via a website that uses a specific video format. As such, when the share includes a video, the experience-sharing server may format the video in the specific video format used by the website before transmitting the video to this viewer. In another example, if a viewer is a PDA that can only play audio feeds in a specific audio format, the server may format an audio portion of a share in the specific audio format used by the PDA before transmitting the audio portion to this viewer. Other examples of formatting a share (or a portion of a share) for a given viewer are also possible. Further, in some instances, the server may format the same share in a different manner for different viewers in the same ESS.

Further, in some instances, an experience-sharing server may compress a share or a portion of a share before transmitting the share to a viewer. For instance, if a server receives a high-resolution share, it may be advantageous for the server to compress the share before transmitting it to the one or more viewers. For example, if a connection between a server and a certain viewer runs too slowly for real-time transmission of the high-resolution share, the server may temporally or spatially compress the share and send the compressed share to the viewer. As another example, if a viewer requires a slower frame rate for video feeds, a server may temporally compress a share by removing extra frames before transmitting the share to that viewer. And as another example, the server may be configured to save bandwidth by down-sampling a video before sending the stream to a viewer that can only handle a low-resolution image. Additionally or alternatively, the server may be configured to pre-process the video itself, e.g., by combining multiple video sources into a single feed, or by performing near-real-time transcription (closed captions) and/or translation.

Yet further, an experiencing-sharing server may decompress a share, which may help to enhance the quality of an ESS. In some embodiments, to reduce transmission load on the connection between a sharer and a server, the sharer may compress a share before sending the share to the server. If transmission load is less of a concern for the connection between the server and one or more viewers, the server may decompress the share before sending it to the one or more viewers. For example, if a sharer uses a lossy spatial compression algorithm to compress a share before transmitting the share to a server, the server may apply a super-resolution algorithm (an algorithm which estimates sub-pixel motion, increasing the perceived spatial resolution of an image) to decompress the share before transmitting the share to the one or more viewers. In another implementation, the sharer may use a lossless data compression algorithm to compress a share before transmission to the server, and the server may apply a corresponding lossless decompression algorithm to the share so that the share may be usable by the viewer.

A server system may also add content to a share. For instance, a server may annotate a share with information about objects in the captured media. As a specific example, once a user indicates a particular item as an item-of-interest, then the server may tag the item by placing an indicator near the image of the item when it appears in the share. The indicator may be selectable by the viewers to direct the viewers to more information about the item. In practice, a server may utilize object-recognition techniques, RFID sensors, stored object resources, and/or network search engines to identify objects from a received share and find additional resources about the objects to add to the share. In some cases, in addition to transmitting added content to viewers, the server system may also transmit added content to the sharer.

In some embodiments, various features may allow viewers to provide comments during an ESS. The comments may take the form of, for example, text, graphics (e.g., photos or other graphic objects), audio and/or video. During the ESS, the server may display the comments to the viewers and/or to the sharer in a real-time fashion, i.e., comments displayed substantially as they are received. For example, viewers may carry on a text chat about items that the shopper is seeing and/or indicating, with comments such as "I really like that lamp" or "Don't get that blender, mine broke the day I bought it." Further, to help more intelligently display comments, comments may be filtered in real-time by the server and/or the sharer. For example, comments about a particular item may be grouped to help allow viewers to peruse related correspondence. As another example, viewers may rate other viewers' comments as particularly useful and the server may responsively display these comments before lower-rated comments.

In an exemplary embodiment, a server system may be configured to receive and deliver various different types of comments. For example, the comments may include various types of media such as text, graphics, audio and/or video, among others. As a particular example, viewers may chat over audio or video conferencing to discuss potential gifts. These conversations may be hidden from the shopper so that viewers can discuss gifts without spoiling the surprise for the shopper. Further, exemplary viewing devices may be configured to create the various different types of comments, and share the comments. As an example, a viewing device may transmit video, audio and text to the server in a particular comment (e.g., a comment such as "This is how that mixer works for me" may be enhanced by the inclusion of a video/audio clip embedded with the comment.)

Yet further, an exemplary wearable computing device, acting as a sharer, may be configured to receive and display or play out the various different types of comments. For example, the server may receive an audio comment from a viewer indicating that the comment should be shared with the shopper. In this situation, the server may transmit the comment to the sharer so that the sharer may present it to the shopper by playing the audio through a speaker system.

In some embodiments, the comments may be an indication of a certain action by the viewer. For example, if an ESS involves a poll, comments may take the form of a vote for a particular selection or particular selections from a number of possible selections provided by the poll.

In a further aspect, a sharer may be configured to request comments from a viewer or viewers during an ESS. For example, the user of the sharer may select a shirt they like and request opinions from viewers regarding the shirt. To initiate a request for comments, the user may, for instance, speak a predetermined phrase (e.g., "please comment") followed by a description of the type of feedback desired (e.g., "what is your opinion on this shirt"). The wearable computer or the experience-sharing server may analyze this statement (possibly by applying speech-to-text and analyzing the text), and responsively send viewers an indication of the request for comment or responsively start a poll of the viewers' opinions about the item. Many other examples are also possible.

As indicated previously, viewers may communicate with each other through commenting. For example, if an item of interest is very expensive; several viewers may collaborate through commenting to purchase the item as a group. In this and other situations, the viewers may indicate that the server should not present viewer-to-viewer comments to the sharer. In some cases, the server may automatically hide the viewer comments from the sharer, unless the viewers indicate that the comment may be presented to the sharer.

ii. Initiating a One-to-One ESS

A sharer may initiate a one-to-one ESS between the sharer and a single viewer. A one-to-one ESS may be initiated in several ways.

For example, a sharer may initiate a one-to-one ESS by sending out an invitation to a particular user. Upon receiving an acceptance of the invitation from a viewer associated with the particular user, the sharer may begin a one-to-one ESS with the viewer.

As another example, a sharer may initiate a one-to-one ESS and by specifying that only one viewer should be allowed to join the ESS at a time (without identifying the specific user or viewer that can join). As such, the sharer may set specific criteria to limit the identity of viewers that are allowed to join the one-to-one ESS, and then accept a viewer that meets the criteria on a first-come first-serve basis. Criteria for the viewer in a one-to-one session may include geographic, demographic, contextual, social-network based, or other user-defined viewer criteria. A viewer may join the ESS if the viewer meets the criteria set by the sharer and if another viewer is not already viewing the ESS. As an alternative to pre-setting viewer criteria, the sharer may manually accept viewers by receiving a request from a prospective viewer, presenting the request, and receiving instructions to allow or deny the request.

As yet another example, a sharer may initiate a one-to-one ESS by sending out an invitation to a viewer, receiving an acceptance of the invitation, and then beginning an ESS with an assigned session mode of one-to-one. The invitation and the acceptance of the invitation may be in a form which best suits the device type of the viewer. Hence, the invitation may be an e-mail, VoIP message, a micro-blog post, or video conference request if the viewer is a desktop computer, while the invitation may be a voice call, video chat, or text message if the viewer is a cell phone. Many other invitation types may be used depending on the device type of the viewer and/or the preferences set on the sharer.

iii. Initiating a One-to-Many ESS

A sharer may also initiate a one-to-many ESS between the sharer and multiple viewers. Alternatively, one of the viewing devices may initiate a one-to-many ESS. A one-to-many ESS may be initiated by any of several initiation techniques. Once initiated, the sharer may provide for a viewer or set of viewers to join or leave the one-to-many ESS.

For example, a sharer may initiate an ESS and assign the ESS a session mode of one-to-many, optionally including a maximum allowed number of viewers. Further, the sharer may set specific criteria to limit the identity of viewers that are allowed to join the one-to-many ESS. Criteria may include geographic, demographic, contextual, social-network based, or other user-defined viewer criteria. A viewer may join the ESS if the viewer meets the criteria set by the sharer and if the allowed maximum number of viewers has not been reached. As an alternative to pre-setting viewer criteria, the sharer may manually accept viewers by receiving a request from a prospective viewer, presenting the request to a user, and receiving instructions to allow or deny the request.

In another exemplary initiation procedure, a sharer may initiate a one-to-many ESS by sending out invitations to a set of prospective viewers, receiving at least one acceptance of the invitation, and then beginning an ESS with an assigned session mode of one-to-many. The invitation and the acceptance of the invitation may be in a form which best suits the device type of each viewer. Hence, one invitation may be an e-mail, VoIP message, micro-blog post, or video conference request if one prospective viewer is a desktop computer, while another invitation may be a voice call, video chat, or text message if another prospective viewer is a cell phone. Upon receipt of an acceptance of an invitation, the sharer may immediately begin a one-to-many ESS or the sharer may wait for additional acceptances of invitations or for other reasons.

Still another exemplary initiation technique for a one-to-many ESS may involve an existing ESS, with a session mode other than one-to-many, being modified to become a one-to-many ESS. For example, the sharer or the original viewer of an existing ESS with a session mode of one-to-one may send out a set of invitations to other prospective viewers and, in response to the sharer receiving an acceptance of at least one of the set of invitations, modifying the existing ESS by changing the session mode to one-to-many and continuing the existing ESS with the original viewer and with other viewers that have accepted one of the set of invitations. Alternatively, the sharer of the existing ESS with a session mode of one-to-one may, in response to the sharer receiving an acceptance of at least one of the set of invitations, terminate the existing ESS and begin a new one-to-many ESS with the original viewer and with other viewers that have accepted one of the set of invitations.

While initiating a registry event ESS with a session mode of one-to-one or one-to-many, the initiation procedure may involve the server requesting and/or receiving information about the event or the participants. For example, when initiating a wedding registry ESS, the sharer may indicate shipping information for the shopper, to facilitate delivery of wedding gifts, and information about the wedding (such as, a title: "Jim and Betty's Wedding", calendar information: "Reception at 4:00 at Jim's House", and registry event information: "I'm registering today at Maybury Department Store".) As another example, the sharer may provide timing information for delivery of gifts. In particular, if gifts are to be shipped to one location at the same time, then the sharer may indicate when and where the gifts should be delivered. Additionally, when viewers join the ESS, information may also be requested and/or received from the viewers. For example, viewers may transmit billing information, to facilitate purchase of gifts, along with viewing preferences (e.g., high-quality video only, only display messages from viewers in a particular social network, etc.).

In other cases, the information about the shopper, viewers, and the event may be stored in user-accounts so that the server need not explicitly request this information. Additionally, information that is stored on the server to facilitate the registry event, such as shipping and timing information, may be hidden from the shopper or viewers. In this way, the details of registry event may be used automatically, without requiring excessive user-input or revealing private information.

While a one-to-many ESS continues, the one or more viewers may change in both number and identity. Such changes may occur through a current viewer leaving the one-to-many ESS or through a prospective viewer joining the one-to-many ESS.

One exemplary procedure for a viewer to join a one-to-many ESS may be prospective-viewer-initiated. The initiation process may include the sharer of a current one-to-many ESS: receiving a request from a prospective viewer to participate in the current one-to-many ESS; receiving an acceptance of the request either from an input device or from an automated process; and, responsive to the acceptance, including the prospective viewer as a viewer in the one-to-many ESS.

Another exemplary procedure for a viewer joining a one-to-many ESS may be sharer-initiated. A sharer-initiated ESS may include a sharer of an existing one-to-many ESS: sending an invitation to participate in the current one-to-many ESS to a prospective viewer, receiving an indication that the prospective viewer has accepted the invitation, and in response to the acceptance including the prospective viewer as a viewer in the current one-to-many ESS.

A third exemplary procedure for a new viewer joining a one-to-many ESS may be current-viewer-initiated. Such an initiation procedure may include an existing viewer of an current one-to-many ESS sending an invitation to participate in the current one-to-many ESS to a prospective viewer; the sharer of the current one-to-many ESS receiving an indication that the prospective viewer has accepted the invitation; the sharer presenting the indication in the form of a request to participate from the prospective viewer; the sharer receiving an acceptance of the request either from an input device or from an automated process; and, responsive to the acceptance, including the prospective viewer as a viewer in the current one-to-many ESS.

Throughout a one-to-many ESS, the sharer may receive indications of the number and identities of the current set of one or more viewers.

iv. Initiating a Broadcast ESS

A sharer may also initiate an ESS a share in a broadcast mode, in which the share is broadcast to a website (such as YouTube) where it can be viewed by anyone who is able to access the website. A broadcast ESS may be initiated by user-input to the sharer, an automated process on the sharer, or transition from an existing non-broadcast ESS.

The sharer may initiate a broadcast ESS in response to received user-input. In some embodiments, the sharer may transmit instructions to the website before starting the ESS to prepare the website for receiving the share. Some procedures may also include the sharer receiving an indication that the website is prepared for the broadcast ESS before beginning the broadcast ESS with the website. Additionally, some initiation procedures may include sending notifications to one or more prospective viewers, informing the prospective viewers of the broadcast ESS. In such procedures, notifications may take many forms including, but not limited to, SMS messages, voice messages, micro-blog posts, video conference requests, voice calls, and/or other types of messages.

If an automated process initiates a broadcast ESS, an exemplary initiation process may include an application on the sharer responding to a user-defined event and in response presenting an invitation to the sharer to begin a broadcast ESS. After the sharer receives the invitation from the application, if a positive response is received from an input device, then the sharer may begin a broadcast ESS with the website. As with the sharer-initiated broadcast ESS, the sharer may transmit preparation instructions to the website, transmit notifications to prospective viewers, and/or postpone initiation until an indication of readiness is received from the website. In some embodiments, the application may transmit instructions to a website to prepare for a potential broadcast ESS at the same time that the sharer presents the invitation. In this way, the application may shorten the initiation time by parallelizing the steps of website preparation and receiving an invitation response.

Another exemplary initiation procedure for a broadcast ESS may involve a sharer modifying an existing ESS, with a session mode other than broadcast, to create a broadcast ESS. For example, the sharer of an existing one-to-many ESS may initiate a sharer-initiated broadcast ESS, send invitations to the viewers of the one-to-many ESS to join the broadcast ESS, and transmit the share to both the sharer-initiated broadcast ESS and the existing one-to-many ESS. In some procedures, the sharer may also terminate the existing one-to-many ESS either as a result of a sufficient number of viewers leaving the existing one-to-many ESS or as a result of another event (e.g. timer expiration, bandwidth restriction). In a sharer-modified initiation, the sharer may modify the existing ESS without presenting each step to the HMD, giving the impression that the existing ESS seamlessly transitioned from one session mode to the broadcast mode.

Once a broadcast ESS is initiated, the sharer may capture, process, and transmit the share to the website. Prospective viewers may then seek access to the website in order to participate in the broadcast ESS. Depending on the nature of the web site and the preferences on the sharer, the sharer may receive indications about the viewers of the broadcast ESS.

In addition to general restrictions placed on users by the website, the sharer may send additional criteria to use in limiting which viewers are invited to or allowed to access a broadcast ESS. Limiting criteria may include geographic, demographic, contextual, social-network based, or other user-defined viewer data.

The website of a broadcast ESS may be any website that can receive and display a share. In practice, the website may actually represent multiple websites or web servers. Additionally, an exemplary website may not necessarily handle all portions of a share. For instance, a website configured to present video feeds but not configured to present audio feeds may receive a share consisting only of a video feed. In some embodiments, the sharer of a broadcast ESS may format the share for the specific website before transmitting the share to the website. In other embodiments, the website may format the share after receiving the share from the sharer. In still other embodiments, the sharer and the website may each format the same share before and after transmission, respectively.

Depending on how the website of a broadcast ESS is configured, the sharer may receive and display information from the website about the one or more viewers. Exemplary information about the viewers may include the number of viewers currently accessing the broadcast ESS and the identity of specific viewers. For example, one exemplary embodiment may include the sharer of a broadcast ESS displaying a number that represents a real-time number of viewers accessing the broadcast ESS. As another example, the website and sharer of a broadcast ESS may each host a social networking application in which the sharer is associated with a first user-profile. Then, if one or more of the viewers of the broadcast ESS are associated with other user-profiles of the social networking application, the website may present the identities of the one or more viewers to the sharer if the first profile is identified to be connected to the other user-profiles.

b. Receiving Indications of Items of Interest and Providing Real-Time Updates

At block 504, method 500 involves receiving indications, from the sharing device, of items of interest and responsively adding the items of interest to a registry list. According to an exemplary embodiment, an item of interest may be any article or service to which the user of the sharing device wishes to draw attention. In some cases, the item may be an item for sale that the shopper wishes to receive as a gift.

In some cases, the indication process may be aided by technology at the sharing device. For example, a particular store might provide the shopper with a scanning device (e.g., a bar-code scanner or similar device) if the shopper is preparing a gift registry at the store. Then, the shopper could indicate an item of interest by scanning a barcode on the item with the scanning device. In this situation, the server may receive the indications or items of interest from the scanning device, from the store servers, or from the sharing device.

In other cases, the sharing device or server system may determine that an item is of interest to the shopper. For example, a sharing device may receive a signal from a touchpad 418 or keyboard 428 that identifies an item as an item of interest. As another example, the sharing device itself may include a scanning functionality (e.g., an external scanning device or barcode recognition software linked to the video input.)

In some cases, the server system or sharer may recognize, from the share, that the shopper is performing a predefined input-action that may indicate an item of interest. For example, a server may use speech-recognition algorithms to recognize that the user of the sharing device is talking about a particular item and take this as an implicit indication that the item is of interest. In other examples, the server may recognize an explicit spoken instruction to add the item to the registry (e.g., "Add the red Acme desk lamp to my registry."). In yet another example, a system may recognize that a user is indicating a particular product through a body movement (e.g., pointing a finger at the object, staring at the object for a specific period of time, gesturing with the head, etc.) In response to recognizing a verbal or gestural cue from the user, the sharer may prompt the user to confirm their interest in the item. For example, in response to detecting that the user is pointing at an item, the sharer may provide an "add" icon associated with the item to the sharer's user-interface, which the shopper may select to confirm interest in the item. As another example, in response determining that a user is speaking favorably about an item, the sharer may present an audio prompt, such as an automated voice asking, "Would you like to add this item to your registry?" In either case, the server may specify the implicitly-indicated item and allow the user to confirm or reject adding this item to the registry. Various other systems may be utilized to receive indications of an item of interest.

Upon receiving an indication of an item of interest, the server may add the item to a registry list. In some cases, this registry list may be stored on the experience-sharing server. In other cases, a vendor server system or sharer may store data that comprises the registry list. The data that comprises the registry list may include links to information about a particular item, such as a digital vendor or manufacturer brochure, or information about the item may be stored in the registry list data.

In some embodiments, the shopper may also be provided with procedures for removing items from the registry. Procedures for indicating an item for removal from the registry may be similar to the procedures described above with respect to indicating items for addition to the registry. The indication may be explicit (e.g., selection of a "remove item" command from the interface of the sharer or a store-provided registry device) or implicit (e.g., the server recognizes a spoken indication such as, "I don't want the red lamp anymore.")

At block 506, method 500 involves providing real-time updates of the registry list to the viewing devices. Providing real-time updates may involve providing the registry list and occasionally updating the provided registry list. In some embodiments, the server may provide the registry list in a graphical user-interface that may also include content from the ESS.

Figure 7:
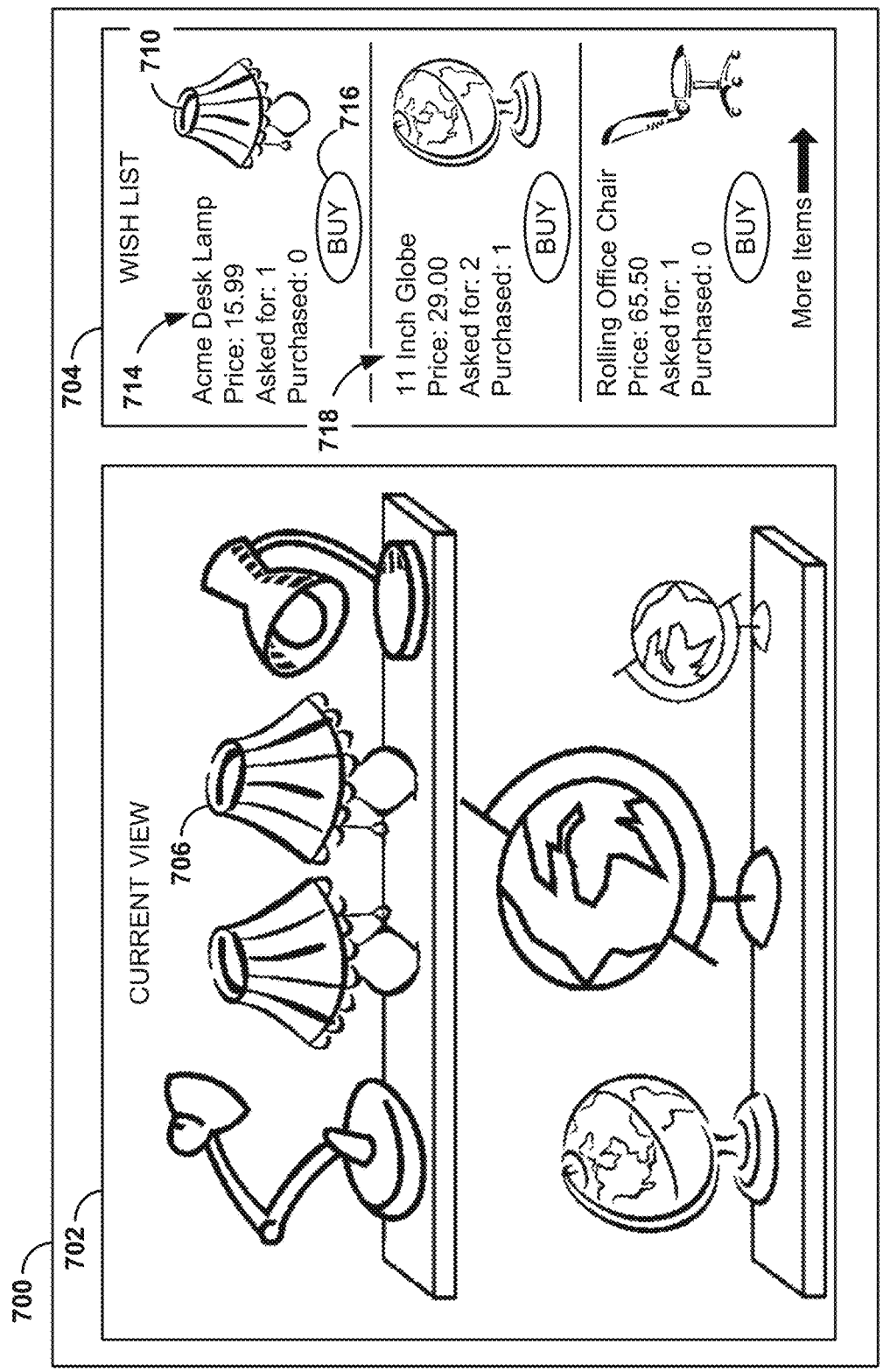
FIG. 7 shows elements of an example viewer interface.

To illustrate, FIG. 7 shows elements of an example graphical interface 700 that a server may provide to the viewers of an ESS. In particular, interface 700 includes a viewing window 702, in which a share related to the shopping experience is depicted, and a registry list window 704, in which items of interest are listed. As shown, the viewing window 702 currently shows a point-of-view video or still picture depicting what the user of the sharer is currently facing. In this example, object 706, shown in viewing window 702, may be an item of interest. Therefore, a corresponding entry for object 706 is included in registry list 704. This entry includes an image 710 of item 706, and information 714 about the item. Additionally, the registry list includes a command button 716 that a viewer may activate to purchase the item of interest.

The viewing window 702 of example graphical interface 700 shows an image of a shopper's current perspective. As discussed above, a sharer may use a variety of media to capture a shopping experience. Likewise, the server may portray the shopping experience using a variety of media and information. For instance, in some cases, multiple viewing windows may each stream separate visual feeds while other windows show additional experience information (e.g., ambient conditions at the sharer, body position, geographic location, etc.) Some embodiments may also involve dynamically changing the type of media that is presented to the viewers (for instance, switching camera feeds based on gaze tracking or turning off elements of a particular share to preserve network resources).

A server may present items of interest to the viewers in various ways. For example, graphical interface 700 presents the items-of-interest in a list with an image 710 and information 714. The order of items in the provided registry list may be determined in a variety of ways. For example, the shopper may indicate to the server the relative interest of particular items, so that the server may rank the items based on relative interest (for instance, by assigning a higher rank to items that have a higher relative interest to the shopper.) As another example, the server may gather various data about the items to assign rankings. Such ranking data may include, for instance, product reviews, price, viewer preferences, and/or how recently the shopper indicated the item. Other examples of ranking are possible.

In some embodiments, items of interest may be marked with indications in the share. For instance, a server or the sharer may recognize an indicated product in the content of a share and annotate the share with an indicator placed on or near the item. Selection of this indicator (e.g., clicking or panning over the indicator with a pointing element, selecting a corresponding list entry, etc.) may bring up information and interface elements (such as, a "BUY" button) related to the corresponding product. Items of interest may be indicated in other ways as well.

The information 714 about an item of interest may include a name of the item, pricing information, and/or registry information (e.g., the number of duplicate items that a shopper wants to receive or buy, whether one or more of the items have already been purchased by viewers), as shown in FIG. 7. A viewer interface may also include many other types of information about an item. For instance, item information may include product features, product characteristics, alternative/optional features, product ratings, advertising information, similar items, comments from the shopper (e.g., an optional feature that the shopper wants included, things that the shopper is saying as they indicate interest in the item), comments from other viewers, pricing from other vendors, shipping information, and/or availability of product. Further, some implementations may not include an image 710 of the item, while other implementations may include additional visual or audio information about the item. Any of the displayed information may be linked to network or server destinations that provide more item information.

The server may update the provided registry list by adding new items to the registry list. In some cases, the server system may immediately update the registry list in response to receiving an additional indication of an additional item of interest. Alternatively, the server may update the registry list periodically, with the server adding all new items of interest at once. Other implementations are also possible.

In addition to providing updates to the viewers, some exemplary methods may involve the server also providing real-time updates to the sharer. For example, the server may provide a user-interface with the current registry list to display of the sharing device. Then, when the sharer indicates a particular item of interest, the server may update the list on the sharer. In this way, the sharer may ensure that the list is correct. Additionally, the user-interface may allow the user to modify specific orders (e.g., add more duplicates of an item, write a comment about an item, specify desired features, etc.)

c. Receiving Purchase Requests and Initiating Purchase Transactions

At block 508, exemplary method 500 involves receiving a purchase request from at least one viewing device for a selected item of interest on the registry list. A purchase request may be any of a variety of datagrams received by the server from one or more viewing devices. In some cases, this datagram may be an indication of the selected item of interest and the viewer that wishes to purchase the item. In other implementations, the viewing device may send additional information about the purchase request. For example, a purchase request may include billing information associated with the viewer, shipping preferences, or an indication that another viewer is going to share the cost of the selected item. Other information may also be included in a purchase request.

The server may provide user-interface elements that a viewer may select to transmit a purchase request. For example, interface 700 includes a command button 716 that viewers may activate to purchase item 706. In other embodiments, a graphical interface may include other interface elements for enabling a viewer to send a purchase request.

Figure 8:
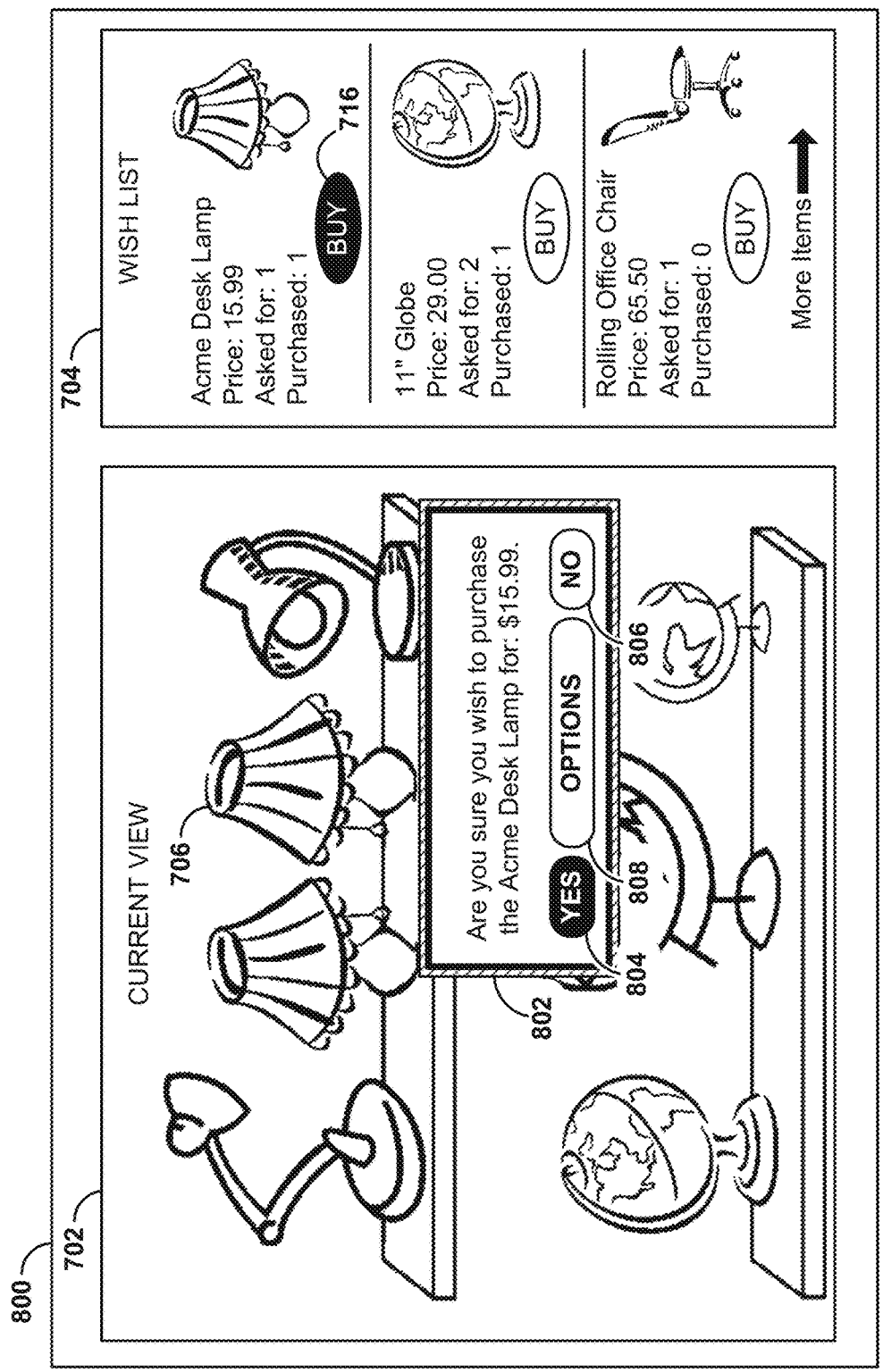
FIG. 8 shows elements of an example viewer interface.

FIG. 8 shows a viewer interface 800 after a user has indicated that they wish to purchase item 706 for the shopper. In particular, the viewer has selected the BUY button 716 from the wish list 704. In response, interface 800 includes a pop-up window 802 that identifies the selected item 706 (along with the item's purchase price) and provides additional interface elements 804, 806 and 808 to the user of the viewer. As shown, the user of the viewer may confirm this purchase by selecting "YES" button 804; cancel the purchase by selecting the "NO" button 806; or specify optional settings by selecting the "OPTIONS" button 808.

In addition to, or instead of, a visual viewer-interface, a viewer may be presented with audio prompts and may provide spoken commands to the server. An audio prompt may be, for example, a voice asking the viewer to make a particular selection (e.g., in the example situation of FIG. 8, the voice may ask "Are you sure you want to purchase the Desk Lamp for $15.99?"). A spoken command from the viewer may be recognized from an audio stream captured at the viewing device, either by the viewing device or by the server. For example, the viewing device may receive a stream of audio associated with the device's user, recognize a spoken command from the audio stream, and send the command to the server in the same way that the device would send a command if a command button were selected from a visual interface. As another example, the viewing device may send an audio stream to the server and the server may recognize audio commands from the stream. Some embodiments may use a combination of audio and visual prompts/interfaces and some embodiments may use audio commands in combination with other input means (such as gestural input, actuation of physical controls, or selection of virtual controls). Other examples are also possible.

In some embodiments, the user of a viewing device may store information on the server system. For example, a server may store purchasing history, billing information, viewing preferences, viewing-device settings, stored ESSs, and/or shipping information. By storing billing and shipping information, for instance, a server may enable viewers to purchase selected products more efficiently. In other cases, a viewer may send information to the server system only when an action is performed (e.g., an item is selected for purchase). In this case, selection of "YES" button 804 may open additional interfaces requesting pertinent information. Other interface elements or functions may also be used.

In some embodiments, various optional settings may be selected and included in a purchase request. In some arrangements, for instance, a purchase request may include specific features of the item (colors, styles, etc.) that the purchaser is attempting to purchase. As another example, a purchase request for an item may include instructions for shipping and handling of the item (e.g., a specific shipping address, expedited shipping, a specified shipping delay, gift wrapping, and or bundling of multiple purchases in one shipping order). In some embodiments, in addition to purchasing an item as a gift for the shopper, the server may enable a viewer to purchase an item of interest for another recipient (e.g., for the viewer themselves, for another viewer, for a recipient that is not participating in the registry event.)

In some embodiments, multiple viewers may share the cost of a single item. In this case, a server may include interface elements and program instructions to facilitate a cooperative-purchase transaction. In particular, in response to receiving a purchase request for an item from one viewer, the server may include the option of cooperative purchasing in a list of additional purchase options (in interface 800, through the selection of OPTIONS button 808). Then, in response to the viewer selecting the cooperative-purchasing option, the server system may await receipt of a purchase request from additional viewers for the same selected item. As another example, one viewer may send a cost-sharing purchase request indicating the other viewers that will be sharing the cost. Then, the indicated viewers may receive messages requesting confirmation of the joint purchase request.

Figure 9A:
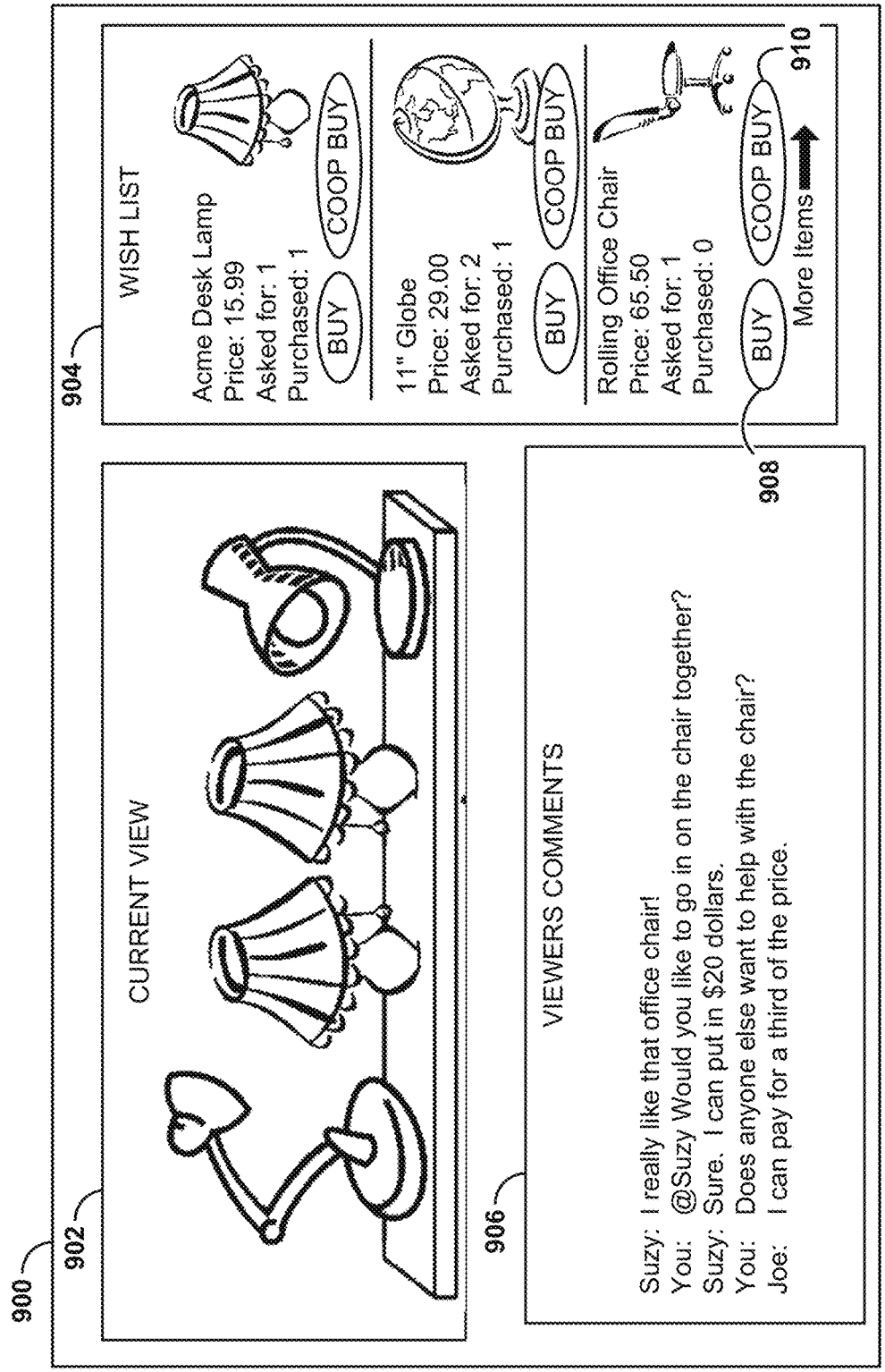
FIG. 9A shows elements of another viewer interface.
Figure 9B:
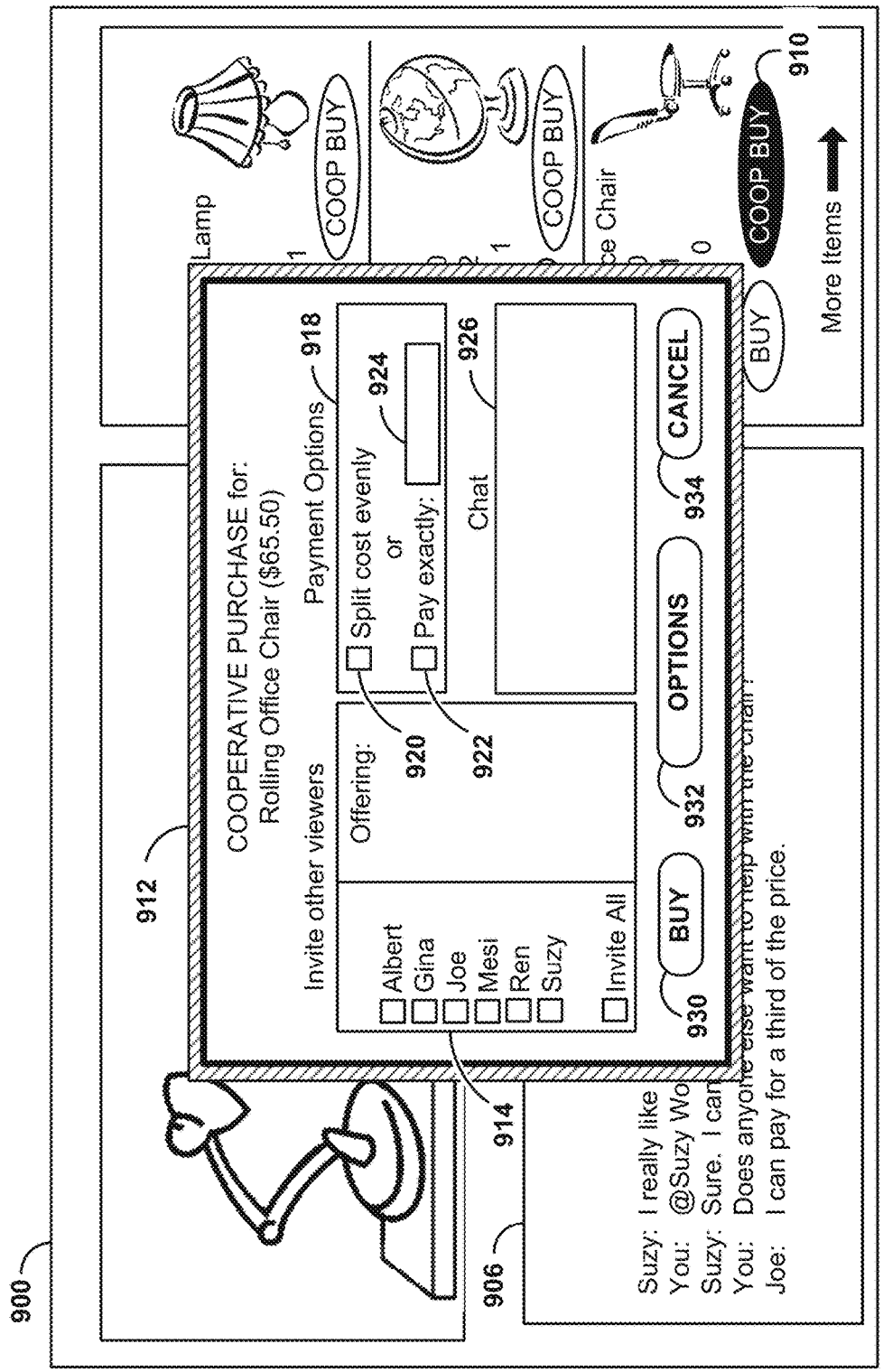
FIG. 9B shows elements of the viewer interface from FIG. 9A after initiating a cooperative purchase.
Figure 9C:
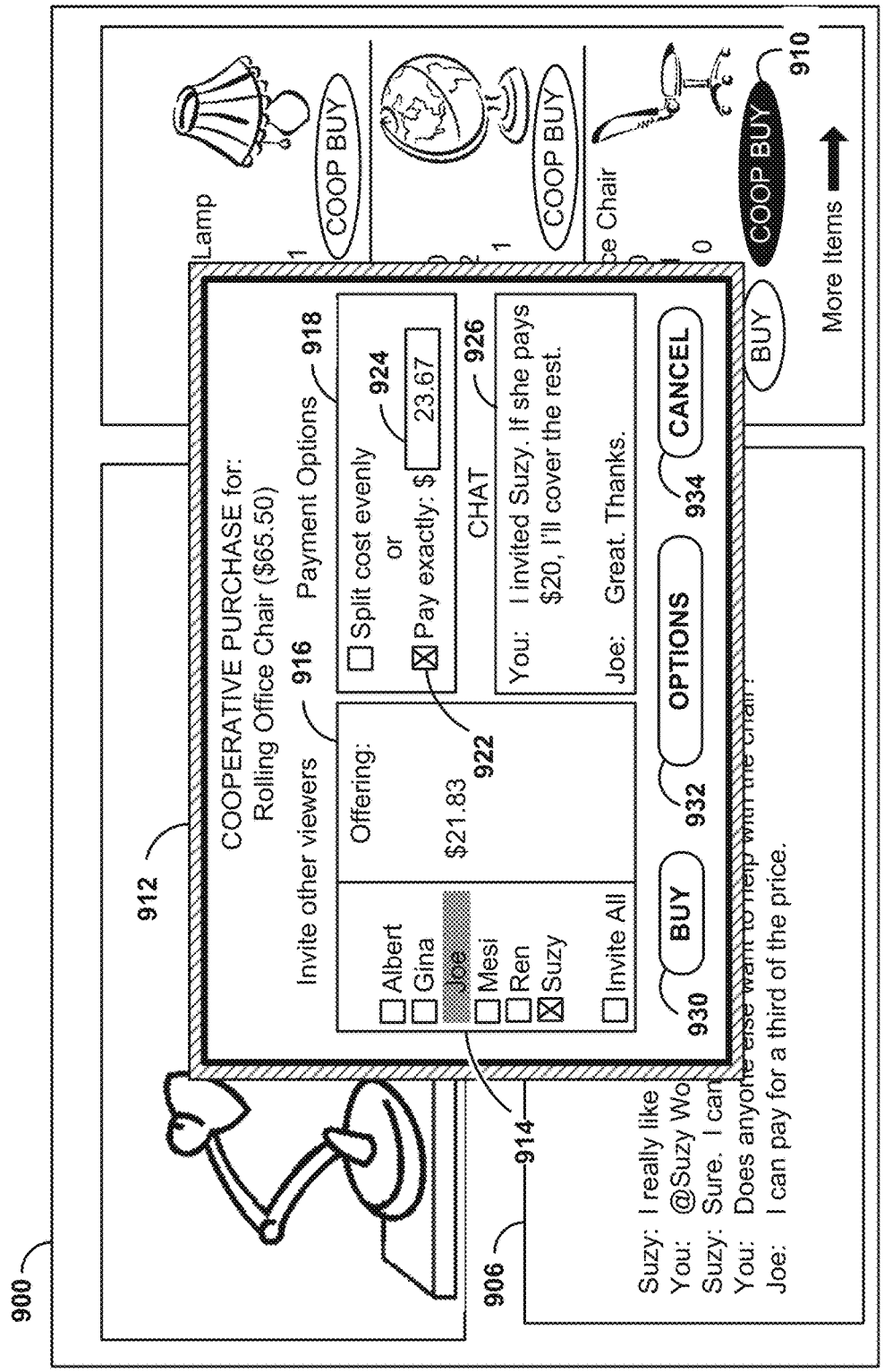
FIG. 9C shows elements of the viewer interface from FIGS. 9A-B during the cooperative purchase.

FIGS. 9A to 9C illustrate example viewer-interface elements that a server may provide to a viewer at various stages of such a cooperative-purchasing procedure. FIG. 9A shows the initial viewer-interface 900, before beginning the cooperative purchase. Similar to viewer-interface 700 from FIG.

7, viewer-interface 900 includes a viewing window 902, showing the shopper's experience, and a registry list window 904, showing a list of items-of-interest and providing the viewer with control elements (like BUY button 908) to facilitate purchasing the items-of-interest. In contrast with interface 700, viewer-interface 900 includes a section for viewers' comments 906 and a respective "COOP BUY" button (such as button 910) for each item-of-interest to facilitate cooperative purchasing.

As shown in the viewers' comments window 906, the viewer (shown as "You") associated with interface 900 is having a conversation with other viewers Suzy and Joe regarding the "Rolling Office Chair" that is an item-of-interest in the registry list window 904. In particular, the three viewers want to each pay for part of the cost of the chair and give the chair as a group gift to the shopper. To facilitate the cooperative purchase, the viewer associated with interface 900 ("You") may initiate a purchase request by selecting "COOP BUY" button 910.

FIG. 9B illustrates example viewer-interface 900 after the viewer associated with interface 900 selects "COOP BUY" button 910. As shown, the selection of button 910 brings up a cooperative-purchasing window 912. Window 912 includes an interface for inviting other viewers 914, an interface for specifying payment options 918, and a chat interface 926. Additionally, window 912 includes command buttons 930, 932, and 934 for directing the server to either continue the transaction (by selecting "BUY" button 930), discontinue the transaction (by selecting "CANCEL" button 934), or provide additional options for the transaction (by selecting "OPTIONS" button 932).

By selecting a viewer from the invitation interface 914, the viewer associated with interface 900 may send cooperative purchase requests to selected viewers or to all the viewers. In response to receiving an invitation for a cooperative purchase, the selected viewers may be provided with an interface similar to cooperative-purchasing window 912.

By selecting box 920, from the payment-options interface 918, the viewer may choose to split the cost evenly between all viewers participating in the cooperative purchase. Alternatively, the viewer may select box 922 to indicate a specific amount (entered into text-box 924) that they are willing to pay. In some cases, the interface may not allow a user to continue with a transaction (e.g., by deactivating command button 930) until the full price is offered by the participating viewers.

FIG. 9C shows interface 900 after the viewer has sent invitations to other viewers Joe and Suzy. As shown, Joe has already accepted the invitation and offered to pay $21.83 (one third of the full price) towards the gift. The "Offering" column 916 of the "Invite other viewers" interface 914 has already been updated to show Joe's offer. Additionally, the viewer ("You") and Joe have used the chat window 926 to discuss the purchase. As was indicated by Suzy in the main comments section 906, Suzy is willing to pay $20 towards the purchase of the rolling chair. The viewer ("You") has elected to pay the remaining cost ($23.67) after Joe and Suzy have offered their respective payments, as indicated by the selection of box 924 and the entry of 23.67 into text-box 924. Various other methods for cooperative purchasing and other user-interface elements and options are possible.

In response to receiving a purchase request, method 500 involves initiating a purchase transaction to bill at least one account associated with the viewing device(s) that requested the purchase and to provide the selected item of interest to the user of the sharing device, as indicated by block 510. In some implementations, in response to receiving a purchase request (or receiving confirmation of the purchase request), a server may refer the viewer to a network destination from which the viewer may purchase the selected product. For instance, in response to a viewer indicating that they wish to purchase a particular item, the viewing device may open a network browsing application and navigate the browser to a site that is associated with a potential vendor of the selected product.

A server may associate some ESSs with one or a set of specific vendors so that viewers are referred to network destinations associated with the specific vendors. In other cases, a server may gather and display a list of potential vendors in the registry list window 704. In some implementations, a server may provide different interface elements (such as separate command buttons 716) for different potential vendors.

A server that stores that stores viewer-information may allow a viewer to fill in form data, such as billing and shipping information, automatically from stored data. In some embodiments, a user may request that the server directly provide billing and shipping information to a particular vendor, without displaying the full form to the viewer. Since some viewers may wish to purchase an item as a gift for the shopper (or for another viewer), the server may use stored shipping information from all participants to enable a viewer to specify shipping destinations for purchased products.

Once the purchase transaction is initiated, the vendor may bill accounts associated the viewer or viewers that requested the purchase. In some cases, the vendor may bill a single account associated with a user of the viewer from which the purchase request was received. In other cases, a single viewer may split the cost of a purchase among multiple billing accounts (e.g., using a prepaid account for some of the cost and a credit card for the rest of the cost). In still other cases, multiple viewers may split the cost of the purchase. When the cost is split between multiple viewers, the server system may automatically split the cost and initiate billing procedures for each of the purchasing viewers. Alternatively, the purchasing viewers may manually specify the amount of the cost that will be paid by each participant, and upon receipt of the splitting information, the server system may initiate billing procedures for each purchasing viewer.

In initiating the purchase transaction, the server system may concurrently update the registry list with an indication of the purchase. For instance, when a viewer purchases an item, the server may responsively annotate that item's entry in the registry list with an indication of the purchase and the identity of the purchaser(s). To illustrate, information 718, about the "11 Inch Globe" of FIG. 7, indicates that the shopper has requested two of the globes ("Requested: 2") and that one globe is purchased ("Purchased: 1").

The server may change the display of an item of interest in other ways in response to a viewer purchasing the item. For example, the server may move the item to the bottom of the list in response to determining that viewers have purchased the requested number of duplicates of an item. As another example, the server may completely remove a purchased item from the list provided to the viewers. In some cases, the updated list provided to the viewers may show the identity of the purchasing viewer(s). In an embodiment that provides updates to a sharer, the server may notify the sharer that a particular item is purchased, but refrain from indicating the viewer(s) that purchased it. In other cases, the server may refrain from notifying the sharer about purchase transactions altogether.

To illustrate, FIG. 10 shows two viewer-interfaces and a sharer interface (including an exemplary sharing device and the sharer's surroundings). FIG. 10 illustrates the different notifications that may be provided to participants when one viewer purchases an item of interest. In other embodiments, the sharer may not receive any notification indicating purchases at the time of purchase. In particular, interface 800 is the interface of the purchasing viewer (shown in greater detail in FIG. 8). As shown, the viewer associated with interface 800 has purchased item 706 from FIGS. 7 and 8. Interface 1000 shows elements of the interface of another viewer, upon receiving an updated registry list. In interface 1000, the entry for item 706 is annotated with a notification 1002 that this item has been purchased. Further, image 1010 shows sharing device 102 with lens element 110. In image 1010, lens element 110 is shown as partially transparent and capable of displaying user-interface elements (for instance notification 1012). Notification 1012, displayed on lens element 110, notifies the sharer that item 706 ("Acme Desk Lamp") has been purchased for the shopper. Additionally or alternatively, other notifications may be provided to the viewers and sharer, including audio notifications or other visual notifications.

In some embodiments, after an item is purchased by one viewer, or set of viewers, the server may help to prevent additional viewers from purchasing extra duplicates of the item. For example, in response to receiving a purchase request for an item that has already been purchased, the server system may send a notification to the viewer that sent the purchase request, informing the viewer that the shopper has already received all of the duplicates of the item that they requested. If a shopper has requested multiple duplicates, the server may refrain from preventing duplicate purchases until the requested amount of an item has been purchased. After receiving the notification, the viewer may cancel the purchase request or, in some embodiments, continue to purchase the item (for instance, if the viewer wishes to buy extra duplicates beyond the amount that the shopper indicated.)

In some implementations, the server may refrain from updating the registry list until after the purchase transaction is successfully completed. In such an implementation, the server may communicate with vendor systems to determine when a purchase transaction has concluded and whether the transaction concluded with a purchase or a cancelation of the purchase. In some cases, between initiating the purchase transaction and determining that the purchase transaction has concluded, the server may prevent additional purchases of the item whether or not the provided list indicates that the purchase has occurred. Then, if the transaction is cancelled, the server may notify any viewers that attempted to purchase the item while the other transaction was pending.

After billing the viewers' accounts, the purchase transaction may involve providing the shopper with the purchased item(s) of interest. For example, the items may be shipped to an address associated with the shopper. As another example, items may be shipped to the address of an event (e.g., a party, a reception, a shower) associated with the registry event. As yet another example, the items may be shipped to individual viewers so that the viewers may deliver the items to the shopper themselves or to the address of the administrating viewer.

In some embodiments, the server may store the identity of purchasing viewer(s) and associate the identities with their respective purchases. In this way, the server may provide the identities of gift givers to the sharer after the event. For example, the server may be programmed to provide the identities of the purchasers at a specified time after the event (e.g., a number of days after the event, a specified future date, etc.) In some cases, the server may provide the identities by including personalized messages from the purchasing viewer(s) with a delivered item.

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method, comprising:
facilitating, by a server system, a registry event comprising an experience-sharing session, wherein the experience-sharing session is between a wearable computing device and one or more viewing devices, and wherein the wearable computing device comprises (a) an audio-capture device arranged to capture audio data when the wearable computing device is worn and (b) a second sensor arranged to capture data indicative of body movement by a wearer of the wearable computing device;

receiving, by the server system, as part of the experience-sharing session, content capturing an experience corresponding to the wearable computing device, wherein the received content comprises at least real-time audio data based on the audio data captured by the audio device and corresponding motion data captured by the second sensor;

detecting, by the server system, based on speech-to-text processing of at least a portion of the real-time audio data, a speech segment comprising an implicit indication of interest in an item of interest, wherein the implicit indication comprises a speech segment identifying the item interest, without a corresponding explicit command to add the item to the registry list;

determining, based on processing of image data of an environment of the wearable computing device, that the item of interest is located at a location in the environment;

detecting, based at least in part on the motion data corresponding to the implicit indication of interest by the speech segment, a body movement referencing the location of the item of interest in the environment;

responsive to at least (a) the detection of the speech segment comprising the implicit indication of interest in the item of interest and (b) the detection of the corresponding body movement referencing the location of the item of interest, adding the item of interest to the registry list;

providing, by the server system, real-time updates of the registry list to the one or more viewing devices, as the one or more items of interest are added to the registry list;

receiving, by the server system, a purchase request from at least one viewing device for a selected item of interest from the registry list; and in response to receiving the purchase request, the server system initiating a purchase transaction process to bill at least one account associated with the at least one viewing device and to provide the selected item of interest to a user of the wearable computing device.

2. The method of claim 1, further comprising:
receiving, from the wearable computing device, real-time image data comprising the image data of an environment of the wearable computing device; and
enabling the one or more viewing devices to access the received real-time image data as part of the experience-sharing session.

3. The method of claim 2, wherein the image data of the environment comprises at least point-of-view video that is captured by an image-capture device at the wearable computing device.

4. The method of claim 1, wherein providing the real-time updates of the registry list comprises:
presenting the registry list to the one or more viewing devices as part of the experience-sharing session; and
updating the presented registry list in response to receiving, from the wearable computing device, additional indications of additional items of interest.

5. The method of claim 4, wherein providing the real-time updates of the registry list further comprises, in response to initiating the purchase transaction process, updating the presented registry list with a notification that the selected item of interest is purchased.

6. The method of claim 1, further comprising: upon initiating the purchase transaction process, providing a notification of the purchase transaction process to the wearable computing device, wherein the notification of the purchase transaction process does not identify the at least one viewing device associated with the at least one billed account.

7. The method of claim 1, further comprising:
in response to initiating the purchase transaction process, adding an entry for the selected item of interest to a list of purchased registry-items, wherein the entry for the selected item of interest identifies the at least one viewing device associated with the at least one billed account; and
at a specified time after the registry event, providing, to the wearable computing device, the list of purchased registry items.

8. The method of claim 1, further comprising, enabling communication between the one or more viewing devices, wherein the communication between the one or more viewing devices is hidden from the wearable computing device.

9. The method of claim 1, wherein the purchase request is received from a plurality of viewing devices, and wherein the purchase transaction process is initiated to bill accounts associated with each of the plurality of viewing devices from which the purchase request is received.

10. The method of claim 1, wherein initiating the purchase transaction process comprises:
determining whether a previous purchase transaction process has been initiated to provide the selected item of interest to the user of the wearable computing device;

if the previous purchase transaction process has been initiated, then refraining from initiating the purchase transaction process; and
if the previous transaction has not been initiated, then initiating the purchase transaction process.

11. The method of claim 1, wherein detecting the body movement referencing the location of the item of interest comprises:
detecting, based on the motion data one of the following body movements: (a) a finger or other body part pointed at the item of interest, (b) a stare at the item of interest for a threshold period of time, (c) a head gesture towards the item of interest.

12. A server system, comprising:
a non-transitory computer-readable medium;
at least one processor;
program instructions stored on the non-transitory computer-readable medium and executable by the at least one processor to cause the server system to:
(i) facilitate a registry event comprising an experience-sharing session, wherein the experience-sharing session is between a wearable computing device and one or more viewing devices, and wherein the wearable computing device comprises (a) an audio-capture device arranged to capture audio data when the wearable computing device is worn and (b) a second sensor arranged to capture data indicative of body movement by a wearer of the wearable computing device;
(ii) receive, as part of the experience-sharing session, content capturing an experience corresponding to the wearable computing device, wherein the received content comprises at least real-time audio data based on the audio data captured by the audio device and corresponding motion data captured by the second sensor;
(iii) detect, based on speech-to-text processing of at least a portion of the real-time audio data, a speech segment comprising an implicit indication of interest in an item of interest, wherein the implicit indication comprises a speech segment identifying the item interest, without a corresponding explicit command to add the item to the registry list;
(iv) determine, based on processing of image data of an environment of the wearable computing device, that the item of interest is located at a location in the environment;
(v) detect, based at least in part on the motion data corresponding to the implicit indication of interest by the speech segment, a body movement referencing the location of the item of interest in the environment;
(vi) responsive to at least (a) the detection of the speech segment comprising the implicit indication of interest in the item of interest and (b) the detection of the corresponding body movement referencing the location of the item of interest, add the item of interest to the registry list;
(vii) provide real-time updates of the registry list to the one or more viewing devices, as the one or more items of interest are added to the registry list;
(viii) receive a purchase request from at least one viewing device for a selected item of interest from the registry list; and
(ix) in response to receiving the purchase request, initiate a purchase transaction process to bill at least one account associated with the at least one viewing device and to provide the selected item of interest to a user of the wearable computing device.

13. The server system of claim 12, wherein the program instructions are further executable by the at least one processor to:
receive, from the wearable computing device, real-time image data comprising the image data of an environment of wearable computing device; and
enable the one or more viewing devices to access the received real-time image data as part of the experience-sharing session.

14. The server system of claim 12, wherein providing the real-time updates of the registry list comprises:
providing the registry list to the one or more viewing devices as part of the experience-sharing session; and
updating the provided registry list in response to receiving, from the wearable computing device, additional indications of additional items of interest.

15. The server system of claim 14, wherein providing the real-time updates of the registry list further comprises, in response to initiating the purchase transaction process, updating the presented registry list with a notification that the selected item of interest is purchased.

16. The server system of claim 12, wherein the program instructions are further executable by the at least one processor to:
in response to initiating the purchase transaction process, add an entry for the selected item of interest to a list of purchased registry-items, wherein the entry for the selected item of interest identifies the at least one viewing device associated with the at least one billed account; and
at a specified time after the registry event, provide, to the wearable computing device, the list of purchased registry items.

17. The server system of claim 12, wherein the program instructions are further executable by the at least one processor to enable communication between the one or more viewing devices, wherein the communication between the one or more viewing devices is hidden from the wearable computing device.

18. The server system of claim 12, wherein the purchase request is received from a plurality of viewing devices, and wherein the purchase transaction process is initiated to bill accounts associated with each of the plurality of viewing devices from which the purchase request is received.

19. A non-transitory computer-readable medium having stored thereon program instructions executable by a processor to cause a server system to perform functions comprising:
facilitating registry event comprising an experience-sharing session, wherein the experience-sharing session is between a wearable computing device and one or more viewing devices, and wherein the wearable computing device comprises (a) an audio-capture device arranged to capture audio data when the wearable computing device is worn and (b) a second sensor arranged to capture data indicative of body movement by a wearer of the wearable computing device;
receiving, as part of the experience-sharing session, content capturing an experience corresponding to the wearable computing device, wherein the received content comprises at least real-time audio data based on the audio data captured by the audio device and corresponding motion data captured by the second sensor;
detecting, by the server system, based on speech-to-text processing of at least a portion of the real-time audio data, a speech segment comprising an implicit indication of interest in an item of interest, wherein the implicit indication comprises a speech segment identifying the item interest, without a corresponding explicit command to add the item to the registry list;
determining, based on processing of image data of an environment of the wearable computing device, that the item of interest is located at a location in the environment;
detecting, based at least in part on the motion data corresponding to the implicit indication of interest by the speech segment, a body movement referencing the location of the item of interest in the environment; and
responsive to at least (a) the detection of the speech segment comprising the implicit indication of interest in the item of interest and (b) the detection of the corresponding body movement referencing the location of the item of interest, adding the item of interest to the registry list;
providing real-time updates of the registry list to the one or more viewing devices, as the one or more items of interest are added to the registry list;
receiving a purchase request from at least one viewing device for a selected item of interest from the registry list; and
in response to receiving the purchase request, initiating a purchase transaction process to bill at least one account associated with the at least one viewing device and to provide the selected item of interest to a user of the sharing device.

* * * * *